US012705940B2

(12) United States Patent
Roy et al.

(10) Patent No.: US 12,705,940 B2
(45) Date of Patent: Aug. 11, 2026

(54) METHOD AND SYSTEM FOR IMPLEMENTING SAFETY MECHANISM IN VEHICLE

(71) Applicant: Wipro Limited, Bangalore (IN)

(72) Inventors: Arindam Roy, Kolkata (IN); Ramya Gorantla, Hyderabad (IN)

(73) Assignee: WIPRO LIMITED, Bangalore (IN)

( * ) Notice: Subject to any disclaimer, the term of this patent is extended or adjusted under 35 U.S.C. 154(b) by 91 days.

(21) Appl. No.: 18/944,653

(22) Filed: Nov. 12, 2024

(65) Prior Publication Data

US 2026/0087863 A1 Mar. 26, 2026

(30) Foreign Application Priority Data

Sep. 24, 2024 (IN) ............................ 202441072156

(51) Int. Cl.
*G07C 5/10* (2006.01)
*G07C 5/08* (2006.01)

(52) U.S. Cl.
CPC ............ *G07C 5/10* (2013.01); *G07C 5/0808* (2013.01)

(58) Field of Classification Search
CPC ............................... G07C 5/10; G07C 5/0808
See application file for complete search history.

(56) References Cited

FOREIGN PATENT DOCUMENTS

| | | | | |
|---|---|---|---|---|
| CN | 109291935 B | 7/2020 | | |
| CN | 110254512 B | 10/2020 | | |
| CN | 111400823 B | 3/2022 | | |
| EP | 4184459 A1 * | 5/2023 | .......... | G07C 5/0808 |

OTHER PUBLICATIONS

International Organization for Standardization, "ISO 26262-3:2018", www.iso.org/standard/68385.html, (2018).

Alessandra Nardi, et al., "Functional Safety Methodologies for Automotive Applications", Cadence.com, https://www.multimediadocs.com/assets/cadence_emea/documents/functional_safety_methodologies_for_automotive_applications.pdf, (2017).

Infineon, "Failure Modes, Effects, and Diagnostic Analysis (FMEDA): AURIXTM MCU", community.infineon.com/t5/Knowledge-Base-Articles/Failure-Modes-Effects-and-Diagnostic-Analysis-FMEDA-AURIX-MCU/ta-p/372906#, Sep. 27, 2022.

* cited by examiner

*Primary Examiner* — Brodie J Follman
(74) *Attorney, Agent, or Firm* — Finnegan, Henderson, Farabow, Garrett & Dunner, LLP

(57) ABSTRACT

This disclosure relates to method and system for implementing safety mechanism in vehicles. The method may include determining a fault parameter corresponding to a hazardous fault occurring in a vehicle. The method may include determining a set of safety requirements, mapped to the error parameter. The method may include identifying at least one diagnostic tests based on a mapping of set of safety requirements and the corresponding error parameter with at least one test identifiers from a plurality of test identifiers created for a plurality of diagnostic tests. The method may further include executing at least one diagnostic tests to determine a predefined component identifier corresponding to a faulty component. The method may further include at least one safety mechanism and at least one safety command associated to the faulty component. The method may include implementing the at least one safety mechanism and the at least one safety command.

15 Claims, 16 Drawing Sheets

400

| Primary Assessment | Secondary Assessment | Fault Parameter ID | Fault Type | Fault Description |
|---|---|---|---|---|
| Object Detection assessment 1 | No Detection assessment | FltCode1 | No Detection | Complete failure to detect objects within the radar's field of view |
| | False Detection assessment | FltCode2 | False Alarm | Detecting non-existent objects or artifacts, leading to false alarms |
| | Loss of Signal assessment | FltCode3 | Signal Dropout | Intermittent loss of signal leading to missed detections |
| | Range Limit assessment | FltCode4 | Limited Range | Inability to detect objects beyond a certain distance, resulting in missed detections |
| Object Detection assessment 2 | Range Accuracy assessment | FltCode5 | Incorrect Range Measurement | Providing inaccurate range measurements for detected objects |
| | Velocity Accuracy assessment | FltCode6 | Incorrect Velocity Measurement | Providing inaccurate velocity measurements for detected objects |
| | Angle Accuracy assessment | FltCode7 | Partial Occlusion Handling | Inability to accurately track objects partially obscured by other objects |
| | Angle Limit assessment | FltCode8 | Limited Angle Coverage | Having blind spots or limited angular coverage, leading to missed detections |
| | Data Merging assessment | FltCode9 | Target Merging | Incorrectly merging multiple detected objects into a single track, leading to inaccurate data |
| Object Detection assessment 3 | Rejection assessment | FltCode10 | Clutter Rejection Failure | Inability to distinguish between real objects and clutter (e.g., rain, debris) |
| | Ambiguity assessment | FltCode11 | Ambiguity Resolution Failure | Failing to resolve ambiguity in target detections, leading to inaccurate data |
| | Shadow assessment | FltCode12 | Shadowing | Failure to detect objects due to shadowing effects caused by obstacles or environmental conditions |
| | Obstruction assessment | FltCode13 | Sensor Occlusion | Radar's field of view obstructed by physical objects, leading to missed detections |
| Interference assessment | Interference Rejection assessment | FltCode14 | Interference Rejection Failure | Inability to reject interference from other radar systems, resulting in degraded performance |
| | Interference Disruption assessment | FltCode15 | Interference Sensitivity | Vulnerability to external electromagnetic interference disrupting radar operation |
| Hardware Failure | Functionality assessment | FltCode16 | Sensor Hardware Failure | Physical failure of radar components (e.g., antenna failure) resulting in complete loss of functionality |

FIG. 4

500

| Fault Parameter | Fault Type | Fault Description | ASIL Rating |
|---|---|---|---|
| FltCode1 | No Detection | Complete failure to detect objects within the radar's field of view | ASIL A |
| FltCode2 | False Alarm | Constantly reporting non-existent objects as valid targets | ASIL A |
| FltCode3 | Interference Sensitivity | Vulnerability to external electromagnetic interference disrupting radar operation | ASIL A |
| FltCode4 | Signal Dropout | Intermittent loss of signal leading to missed detections | ASIL A |
| FltCode5 | Limited Range | Inability to detect objects beyond a certain distance, resulting in missed detections | ASIL A |
| FltCode6 | Incorrect Range Measurement | Providing inaccurate range measurements for detected objects | ASIL B |
| FltCode7 | Incorrect Velocity Measurement | Providing inaccurate velocity measurements for detected objects | ASIL B |
| FltCode8 | Partial Occlusion Handling | Inability to accurately track objects partially obscured by other objects | ASIL B |
| FltCode9 | Limited Angle Coverage | Having blind spots or limited angular coverage, leading to missed detections | ASIL B |
| FltCode10 | Target Merging | Incorrectly merging multiple detected objects into a single track, leading to inaccurate data | ASIL B |
| FltCode11 | False Object Detection | Detecting non-existent objects or artifacts, leading to false alarms | ASIL C |
| FltCode12 | Clutter Rejection Failure | Inability to distinguish between real objects and clutter (e.g., rain, debris) | ASIL C |
| FltCode13 | Ambiguity Resolution Failure | Failing to resolve ambiguity in target detections, leading to inaccurate data | ASIL C |
| FltCode14 | Interference Rejection Failure | Inability to reject interference from other radar systems, resulting in degraded performance | ASIL C |
| FltCode15 | Shadowing | Failure to detect objects due to shadowing effects caused by obstacles or environmental conditions | ASIL C |
| FltCode16 | Sensor Occlusion | Radar's field of view obstructed by physical objects, leading to missed detections | ASIL D |
| FltCode17 | Sensor Hardware Failure | Physical failure of radar components (e.g., antenna failure) resulting in complete loss of functionality | ASIL D |
| FltCode18 | Sensor Fusion Failure | Failure in integrating radar data with data from other sensors (e.g., cameras, lidar), leading to incomplete or inaccurate data fusion | ASIL D |

A B C D E

FIG. 5A

500

| A | B | C | D | E |
|---|---|---|---|---|
| FltCode19 | Environmental Variability | Radar performance degrades significantly under varying environmental conditions (e.g., weather, lighting), leading to unreliable data | ASIL D |
| FltCode20 | Spoofing Vulnerability | Vulnerability to spoofing attacks where false signals are injected to deceive the system, leading to inaccurate or manipulated data | ASIL D |
| FltCode21 | Temporary Signal Dropouts | Momentary interruptions in radar signal reception due to environmental factors or electromagnetic interference that do not disrupt the vehicle's perception of its surroundings | QM-NE |
| FltCode22 | Minor False Alarms | Occasional false detections caused by radar artifacts or non-target objects, which are correctly filtered out by the vehicle's perception system without impacting its decision-making | QM-NP |
| FltCode23 | Temporary Range Inaccuracies | Brief deviations in range measurements due to atmospheric conditions or calibration drift that do not compromise the vehicle's ability to accurately detect nearby objects | QM-NE |
| FltCode24 | Intermittent Clutter | Periodic presence of clutter in radar returns, such as rain or insects, which does not interfere with the vehicle's ability to detect and track relevant objects | QM-NE |
| FltCode25 | Slight Velocity Deviations | Small discrepancies in velocity measurements caused by minor sensor disturbances | QM-NP |
| FltCode26 | Interference from Nearby Radars | Brief interference from other radar systems operating in the vicinity | QM-NP |
| FltCode27 | Temporary Calibration Errors | Short-term inaccuracies in radar calibration parameters due to environmental changes | QM-NE |
| FltCode28 | Partial Sensor Blockage | Temporary obstruction of a portion of the radar sensor's field of view by passing vehicles | QM-NP |
| FltCode29 | Minor Multipath Effects | Low-level reflections of radar signals from nearby surfaces or structures | QM-NP |
| FltCode30 | Partial Occlusion by Rain or Snow | Temporary obstruction of radar signals by precipitation, such as rain or snow | QM-SF |
| FltCode31 | Low Signal-to-Noise Ratio | Brief periods of reduced SNR due to environmental factors or sensor noise | QM-NE |
| FltCode32 | Minor Hardware Glitches | Momentary malfunctions in radar hardware components | QM-SF |
| FltCode33 | Limited Angle Coverage | Temporary reduction in radar coverage due to sensor mounting restrictions | QM-NP |
| FltCode34 | Temporary Data Packet Loss | Occasional loss of radar data packets during transmission or processing | QM-SF |
| FltCode35 | Transient Environmental Variations | Short-term changes in environmental conditions, such as sudden changes in temperature | QM-NP |

FIG. 5B

600

| Fault Parameter ID | ASIL Rating | Safety Criteria ID | Safety Criteria | Safety Criteria Description |
|---|---|---|---|---|
| FltCode1 | ASIL C | SG_01 | Detect Obstacles | Ensure the radar system reliably detects obstacles in the vehicle's path to prevent collisions. |
| FltCode2 | ASIL B | SG_02 | Classify Objects | Classify detected objects accurately to differentiate between pedestrians, vehicles, and other obstacles |
| FltCode3 | ASIL B | SG_03 | Track Object Movement | Continuously track the movement of detected objects to anticipate potential hazards |
| FltCode4 | ASIL C | SG_04 | Avoid False Positives | Minimize false positive detections to prevent unnecessary braking or evasive maneuvers. |
| FltCode5 | ASIL A | SG_05 | Avoid False Negatives | Minimize false negative detections to ensure that all obstacles are detected, even in challenging conditions |
| FltCode6 | ASIL D | SG_06 | Maintain Redundancy | Implement redundant radar systems to ensure fault tolerance and reliable operation. |
| FltCode7 | ASIL B | SG_07 | Ensure Data Integrity | Verify the integrity of radar data to prevent corrupted or inaccurate information from impacting decision-making |
| FltCode8 | ASIL C | SG_08 | Maintain Sensor Fusion | Integrate radar data with data from other sensors (e.g., lidar, cameras) to enhance object detection and tracking capabilities |
| FltCode9 | ASIL B | SG_09 | Handle Sensor Occlusion | Develop algorithms to handle situations where objects are partially or fully occluded from radar view |
| FltCode10 | ASIL C | SG_10 | Mitigate Interference | Minimize interference from other radar systems or environmental factors to maintain accurate detection performance |
| FltCode11 | ASIL D | SG_11 | Detect Radar Failures | Implement self-diagnostic mechanisms to detect faults or failures in the radar system |
| FltCode12 | ASIL B | SG_12 | Validate Calibration | Regularly validate and calibrate radar systems to ensure accuracy and reliability |
| FltCode13 | ASIL A | SG_13 | Monitor Environmental Conditions | Monitor environmental factors (e.g., weather, lighting) and adjust radar performance accordingly to maintain optimal operation |
| FltCode14 | ASIL B | SG_14 | Predict Object Trajectories | Predict the future trajectories of detected objects to anticipate potential collision scenarios |
| FltCode15 | ASIL C | SG_15 | Prioritize Object Detection | Prioritize the detection and tracking of objects based on their proximity and potential threat level |
| FltCode16 | ASIL D | SG_16 | Maintain System Compatibility | Ensure compatibility between radar systems and vehicle hardware and software components to prevent integration issues |
| FltCode17 | ASIL A | SG_17 | Enable Safe Emergency Maneuvers | Provide accurate radar data to enable safe emergency braking or steering maneuvers in critical situations |
| FltCode18 | ASIL D | SG_18 | Ensure Functional Safety | Implement safety mechanisms to ensure the functional safety of the radar system and its interactions with other vehicle systems |
| FltCode19 | ASIL B | SG_19 | Validate Object Identification | Validate the identification of detected objects to prevent misclassification errors |
| FltCode20 | ASIL D | SG_20 | Support Redundant Communication | Support redundant communication channels for radar data transmission to ensure fault tolerance and reliability |

FIG. 6

700

| Fault Parameter ID | Error Parameter ID | Error Name | Error Description |
|---|---|---|---|
| FltCode1 | ErrCode1 | Job does not return within specified time 1 | Hardware processor engine is hung |
| FltCode2 | ErrCode2 | Job does not return within specified time 2 | Algorithm job software is stuck due to - Infinite loop |
| FltCode3 | ErrCode3 | Job does not return within specified time 3 | Algorithm job software is stuck due to - Deadlock |
| FltCode4 | ErrCode4 | Job does not return within specified time 4 | Algorithm job software is stuck due to - Software crash |
| FltCode5 | ErrCode5 | Processor diagnostic failure 1 | Overheating: Excessive heat can lead to thermal throttling or even permanent damage to the processor, causing it to fail diagnostics |
| FltCode6 | ErrCode6 | Processor diagnostic failure 2 | Voltage Irregularities: Fluctuations in voltage supply can destabilize the processor's operation, leading to diagnostic failures |
| FltCode7 | ErrCode7 | Processor diagnostic failure 3 | Physical Damage: Mechanical shocks or improper handling during installation can physically damage the processor, resulting in diagnostic failures. |
| FltCode8 | ErrCode8 | Processor diagnostic failure 4 | Electrical Shorts: Short circuits within the processor or its surrounding components can disrupt its functionality, causing diagnostic failures |
| FltCode9 | ErrCode9 | Processor diagnostic failure 5 | Memory Errors: Issues with the processor's memory subsystem, such as faulty RAM modules or cache corruption, can lead to diagnostic failures. |
| FltCode10 | ErrCode10 | Processor diagnostic failure 6 | Software Compatibility Issues: Incompatibilities between the processor and certain software applications or drivers can lead to diagnostic failures when executing specific tasks or instructions. |
| FltCode11 | ErrCode11 | Processor diagnostic failure 7 | Electromagnetic Interference (EMI): External electromagnetic fields or interference from nearby electronic devices can disrupt the operation of the processor, resulting in diagnostic failures. |
| FltCode12 | ErrCode12 | Processor diagnostic failure 8 | Firmware Corruption: Corruption or errors in the processor's firmware or microcode can lead to diagnostic failures during initialization or operation. |
| FltCode13 | ErrCode13 | Parameter error – data corruption 1 | Data corruption in processor application or driver. Software bug in processor application or driver |
| FltCode14 | ErrCode14 | Parameter error - data corruption 2 | Memory Corruption: Improper memory management or access violations within the processor application or driver can lead to data corruption. |

A B C D E

FIG. 7A

700

A B C D E

| | | | |
|---|---|---|---|
| FltCode15 | ErrCode15 | Parameter error - data corruption 3 | Buffer Overflow: Writing data beyond the boundaries of allocated memory buffers can overwrite adjacent memory regions, causing data corruption |
| FltCode16 | ErrCode16 | Parameter error – Driver error | Faulty Error Handling: Inadequate error handling mechanisms within the processor application or driver can lead to data corruption when encountering unexpected conditions. |
| FltCode17 | ErrCode17 | Parameter error – Driver incompatible 1 | Incompatibility with Operating System Updates: Changes introduced in operating system updates may render existing processor applications or drivers incompatible, leading to data corruption |
| FltCode18 | ErrCode18 | Parameter error – Driver incompatible 2 | Interrupt Handling Issues: Improper handling of interrupts or hardware events by the processor application or driver can result in data corruption during critical operations |
| FltCode19 | ErrCode19 | Parameter error – Software bugs | Driver Bugs: Software bugs or programming errors within device drivers responsible for interacting with hardware components can lead to data corruption |
| FltCode20 | ErrCode20 | Parameter error – Input validation error | Input Validation Errors: Failure to properly validate input data received by the processor application or driver can lead to unexpected behaviour and data corruption |
| FltCode21 | ErrCode21 | Stale Input Data | System latency too high - processor software bug (e.g. cache bug) |
| FltCode22 | ErrCode22 | Memory Leaks | Failure to release allocated memory after it's no longer needed, resulting in gradual depletion of available memory resources |
| FltCode23 | ErrCode23 | Fragmentation | Fragmentation of memory space occurs when the available memory is divided into small, non-contiguous blocks, which can lead to inefficient memory usage and reduced performance. |
| FltCode24 | ErrCode24 | Memory Thrashing | Occurs when the system spends more time moving data between main memory and secondary storage (e.g., disk) than actually executing tasks, leading to severe performance degradation. |

FIG. 7B

800

| Error Parameter ID | Safety Requirement Description | Set of Safety Parameter | HSR/SSR ID |
|---|---|---|---|
| ErrCode1 | Must run a real-time operating system (RTOS). | Software | SSR1 |
| ErrCode2 | Include robust error handling mechanisms. | Software | SSR2 |
| ErrCode3 | Implement logging and monitoring of system performance. | Software | SSR3 |
| ErrCode4 | Support automatic recovery procedures. | Software | SSR4 |
| ErrCode5 | Include thermal sensors and an automatic shutdown feature. | Hardware | HSR1 |
| ErrCode6 | The HPC must have a stable and regulated power supply. | Hardware | HSR2 |
| ErrCode7 | Mounted on anti-vibration platforms to prevent damage. | Hardware | HSR3 |
| ErrCode8 | Ensure electrical isolation between CAN bus and HPC circuitry. | Hardware | HSR4 |
| ErrCode9 | Implement redundant data storage. | Software | SSR5 |
| ErrCode10 | Implement strict access control mechanisms. | Software | SSR6 |
| ErrCode11 | Equip with proper electromagnetic interference (EMI) shielding. | Hardware | HSR5 |
| ErrCode12 | Support automatic updates for security patches and features. | Software | SSR7 |
| ErrCode13 | Use data encryption for sensitive radar signal data. | Software | SSR8 |
| ErrCode14 | Implement data integrity checks (e.g., CRC) | Software | SSR9 |
| ErrCode15 | Monitor system performance and optimize resource usage. | Software | SSR10 |
| ErrCode16 | Include robust error handling mechanisms. | Software | SSR11 |
| ErrCode17 | Ensure software scalability for increasing data loads. | Software | SSR12 |
| ErrCode18 | Implement redundancy management for CAN bus interfaces. | Software | SSR13 |
| ErrCode19 | Comply with relevant industry standards and regulations. | Software | SSR14 |
| ErrCode20 | Include a fail-safe mode for critical failures. | Software | SSR15 |

FIG. 8

900

| Error Parameter ID | Safety Requirement Description | Set of Safety Parameter | HSR/SSR ID | Test ID |
|---|---|---|---|---|
| ErrCode1 | Must run a real-time operating system (RTOS). | Software | SSR1 | TestID1 |
| ErrCode2 | Include robust error handling mechanisms. | Software | SSR2 | TestID2 |
| ErrCode3 | Implement logging and monitoring of system performance. | Software | SSR3 | TestID3 |
| ErrCode4 | Support automatic recovery procedures. | Software | SSR4 | TestID4 |
| ErrCode5 | Include thermal sensors and an automatic shutdown feature. | Hardware | HSR1 | TestID5 |
| ErrCode6 | The HPC must have a stable and regulated power supply. | Hardware | HSR2 | TestID6 |
| ErrCode7 | Mounted on anti-vibration platforms to prevent damage. | Hardware | HSR3 | TestID7 |
| ErrCode8 | Ensure electrical isolation between CAN bus and HPC circuitry. | Hardware | HSR4 | TestID8 |
| ErrCode9 | Implement redundant data storage. | Software | SSR5 | TestID9 |
| ErrCode10 | Implement strict access control mechanisms. | Software | SSR6 | TestID10 |
| ErrCode11 | Equip with proper electromagnetic interference (EMI) shielding. | Hardware | HSR5 | TestID11 |
| ErrCode12 | Support automatic updates for security patches and features. | Software | SSR7 | TestID12 |
| ErrCode13 | Use data encryption for sensitive radar signal data. | Software | SSR8 | TestID13 |
| ErrCode14 | Implement data integrity checks (e.g., CRC) | Software | SSR9 | TestID14 |
| ErrCode15 | Monitor system performance and optimize resource usage. | Software | SSR10 | TestID15 |
| ErrCode16 | Include robust error handling mechanisms. | Software | SSR11 | TestID16 |
| ErrCode17 | Ensure software scalability for increasing data loads. | Software | SSR12 | TestID17 |
| ErrCode18 | Implement redundancy management for CAN bus interfaces. | Software | SSR13 | TestID18 |
| ErrCode19 | Comply with relevant industry standards and regulations. | Software | SSR14 | TestID19 |
| ErrCode20 | Include a fail-safe mode for critical failures. | Software | SSR15 | TestID20 |

FIG. 9

1000

| Safety Criteria ID(s) | Effect Parameter ID | Effect Parameter | Effect Description |
|---|---|---|---|
| SG_04, SG_10 | EffIDX001 | Erroneous Object Detection | Incorrect detection of objects such as vehicles, pedestrians, or obstacles |
| S10G_01, SG_ | EffIDX002 | Missed Object Detection | Failure to detect critical objects within the vehicle's surroundings |
| 04SG_ | EffIDX003 | False Positive Object Detection | Incorrectly identifying non-existent objects as hazards |
| SG_02 | EffIDX004 | Inaccurate Object Localization | Misjudging the precise location of detected objects |
| SG_03, SG_10 | EffIDX005 | Unpredictable Object Trajectories | Failure to accurately predict the movement paths of detected objects |
| SG_10 | EffIDX006 | Delayed Object Detection | Lag in detecting objects, leading to reduced reaction time for autonomous vehicle systems |
| SG_01 | EffIDX007 | Collision Avoidance Failure | Inability to successfully avoid collisions with detected objects |
| SG_04, SG_10 | EffIDX008 | Unintended Braking or Evasive Maneuvers | Incorrectly triggering braking or steering actions due to faulty radar data |
| SG_04 | EffIDX009 | Traffic Rule Violations | Violations of traffic rules or regulations due to erroneous object detection |
| SG_10 | EffIDX010 | Lane Departure or Drifting | Failure to accurately detect lane markings or neighboring vehicles, leading to unintentional lane departures |
| SG_01, SG_04, SG_10 | EffIDX011 | Erratic Vehicle Behaviour | Unexpected vehicle movements or behaviors due to faulty object detection |
| SG_04 | EffIDX012 | Loss of Control | Reduced control over the vehicle's movement trajectory due to inaccurate radar data |
| SG_01, SG_04 | EffIDX013 | Pedestrian Endangerment | Endangering pedestrians due to missed detections or false positives |
| SG_01 | EffIDX014 | Obstacle Collision | Collisions with stationary objects due to failure to detect or avoid them |
| SG_01 | EffIDX015 | Intersection Safety Compromise | Failure to detect vehicles or pedestrians at intersections, leading to potential accidents |
| SG_10 | EffIDX016 | Parking Incidents | Difficulty in parking or maneuvering the vehicle safely in parking lots or tight spaces |
| SG_10 | EffIDX017 | Decreased Driving Comfort | Unpredictable vehicle movements or actions leading to discomfort for passengers |
| SG_10 | EffIDX018 | Reduced Autonomy | Decreased autonomy due to reliance on faulty radar data, requiring human intervention |
| SG_04, SG_10 | EffIDX019 | Loss of Trust in Autonomous Systems | Reduced trust in autonomous vehicle systems among passengers or road users due to perceived unreliability |
| SG_01, SG_04 | EffIDX020 | Increased Risk of Accidents | Overall increase in the risk of accidents and collisions on the road due to compromised radar sensor data |

FIG. 10

1100

| Effect Parameters ID | Safety Command ID | Safety Command Name | Safety Command Description |
|---|---|---|---|
| EffIDX001 | SCL001 | SSA-1 | In-lane stop at 0.4g deceleration, following a predetermined trajectory with hazard lamp activation by VIC |
| EffIDX002 | SCL002 | SSA-2 | In-lane stop at 1g deceleration with automatic hazard lamp activation by VIC for alerting other drivers |
| EffIDX003 | SCL005 | ASA-3 | In-lane stop with 0.1g to 0.4g deceleration, hazard lamp activation, parking brakes application, gear shifting to park, and door unlocking |
| EffIDX004 | SCL003 | ASA-1 | Halting at designated pick-up/drop-off point, hazard light activation, and passenger side door unlocking upon task completion |
| EffIDX005 | SCL007 | ASA-5 | In-lane stop with 0.4g to 1g deceleration, hazard lamp activation, parking brakes application, gear shifting to park, and door unlocking |
| EffIDX006 | SCL006 | ASA-4 | Controlled stop within lane, 0.1g to 0.4g deceleration, hazard lamp activation, parking brakes application, gear shifting to park, and door unlocking |
| EffIDX007 | SCL004 | ASA-2 | Safely pulling over, activating hazard lamps, applying parking brakes, shifting to park gear, and unlocking doors for safe exit |
| EffIDX008 | SCL001 | SSA-1 | In-lane stop at 0.4g deceleration, following a predetermined trajectory with hazard lamp activation by VIC |
| EffIDX009 | SCL009 | IMA-2 | Completing passenger mission, unlocking doors, finding safe parking or loading zone, activating hazard lamps, and waiting for further instructions |
| EffIDX010 | SCL005 | ASA-3 | In-lane stop with 0.1g to 0.4g deceleration, hazard lamp activation, parking brakes application, gear shifting to park, and door unlocking |
| EffIDX011 | SCL006 | ASA-4 | Controlled stop within lane, 0.1g to 0.4g deceleration, hazard lamp activation, parking brakes application, gear shifting to park, and door unlocking |
| EffIDX012 | SCL001 | SSA-1 | In-lane stop at 0.4g deceleration, following a predetermined trajectory with hazard lamp activation by VIC |
| EffIDX013 | SCL008 | IMA-1 | Completing ongoing passenger mission, unlocking doors, and returning to depot for maintenance and refueling |
| EffIDX014 | SCL004 | ASA-2 | Safely pulling over, activating hazard lamps, applying parking brakes, shifting to park gear, and unlocking doors for safe exit |
| EffIDX015 | SCL011 | VSA-2 | Halting acceleration test at specified limits (0.6g for AV Proto, 0.4g for AV Pilot), activating hazard lamps for visibility during testing process. |
| EffIDX016 | SCL005 | ASA-3 | In-lane stop with 0.1g to 0.4g deceleration, hazard lamp activation, parking brakes application, gear shifting to park, and door unlocking |
| EffIDX017 | SCL006 | ASA-4 | Controlled stop within lane, 0.1g to 0.4g deceleration, hazard lamp activation, parking brakes application, gear shifting to park, and door unlocking |
| EffIDX018 | SCL009 | IMA-2 | Completing passenger mission, unlocking doors, finding safe parking or loading zone, activating hazard lamps, and waiting for further instructions |
| EffIDX019 | SCL010 | VSA-1 | Obsolete safety command that is no longer supported |
| EffIDX020 | SCL002 | SSA-2 | In-lane stop at 1g deceleration with automatic hazard lamp activation by VIC for alerting other drivers |

FIG. 11

1200

| Component ID | HSR/SSR ID | HW/SW Fault Description | Safety Mechanism IDs | Safety Mechanism Description |
|---|---|---|---|---|
| CompID1 | HSR1 | HW: Aurix 1/2 monitors transceiver related faults through FSP1_AX1/2_AX5, SS1_PMICx_R signals | SM001, SM003 | SM001: MCU emergency stop in case of severe MCU failure. SM003: Implements self-test mechanism for SFFs in functional blocks to detect faults in monitors. |
| _ | _ | SW: None | _ | _ |
| CompID2 | HSR2 | HW: Aurix 3 monitors sensor faults through FSP2_AX6/AX9, SS2_PMICx_R signals. | SM014, SM012 | SM014: Uses redundant sensors to cross-verify data. SM012: Monitors device temperature to prevent over-heating. |
| CompID2 | SSR2 | SW: Software monitors data integrity during transmission | SM009, SM010 | SM009: Verifies data integrity during transmission or storage. SM010: Handles unexpected events or conditions in software to maintain stability. |
| CompID3 | HSR3 | HW: MCU monitors voltage levels to prevent unpredictability | SM005, SM015 | SM005: Monitors runtime voltage levels in the external power supply. SM015: Monitors actuator performance and integrity. |
| CompID3 | SSR3 | SW: Error handling mechanisms ensure system stability during faults | SM006 | SM006: Software mechanism to handle errors and faults gracefully. |
| CompID4 | HSR4 | HW: Sensors monitor structural health of critical vehicle components | SM016, SM018 | SM016: Monitors structural integrity of vehicle components. SM018: Protects components from overload conditions. |
| CompID4 | SSR4 | SW: Redundancy checking for fault-tolerant operations | SM008 | SM008: Checks redundant components for consistency. |
| CompID5 | HSR5 | HW: Actuator monitoring for precise and safe mechanical operations | SM015, SM017 | SM015: Monitors actuator performance and integrity. SM017: Provides emergency backup power source to critical systems. |
| CompID5 | SSR5 | SW: Watchdog timer ensures software modules execute within predefined time limits | SM007 | SM007: Ensures software modules execute within predefined time limits; triggers reset on timeout. |

FIG. 12

METHOD AND SYSTEM FOR IMPLEMENTING SAFETY MECHANISM IN VEHICLE

TECHNICAL FIELD

This disclosure generally relates to the safety mechanism in a vehicle, and more particularly to the method and system for implementing safety mechanisms in the vehicle for mitigating one or more faults associated with one or more faulty components in the vehicle.

BACKGROUND

Functional safety indicates functions embedded in a vehicle to ensure a level of acceptable safety. Even though the vehicle may be aimed for zero defects, various components may be prone to failure or be susceptible to damage. As a vehicle system is ever-changing and becoming complex with time due to the addition of features, ensuring safety is also a complex process. The vehicle system includes braking, steering, powertrain, electronic stability control, and advanced driver assistance systems.

Further, the vehicles are equipped with safety monitoring systems that monitor various operational parameters of the vehicle to provide functional safety. The safety monitoring systems of vehicles may be capable of providing safety through various sensors that monitor various operational parameters of the vehicle to detect and monitor one or more faults. Examples of such sensors include temperature sensors, proximity sensors, etc. that operate in tandem to monitor potential hazards and receive other relevant information, to assist the driver in avoiding accidents or collisions.

Conventionally, comprehensive monitoring of all the faults and malfunctions occurring in the vehicle may not be performed due to complex vehicle systems. Particularly, comprehensive monitoring of component-related faults through specific functional tests may not be considered. The component-related faults include hardware-related faults, software-related faults, and effects of faults, etc. In other words, the hardware-related faults and the software-related faults may not be identified separately, thus the detection of the fault may become inaccurate and unreliable. Also, the hardware-related faults are not detected in the vehicle by the safety monitoring systems. The hardware-related faults may include the faults in various hardware components of the vehicle. Instead, the safety monitoring systems may provide safety control strategies, such as steering stability control, tire pressure monitoring, etc., required to be implemented by the driver. Also, the software-related faults may go undetected, that may reduce the functional safety of vehicle.

Also, monitoring of faults may not be comprehensive and may lack consideration of all possible failure modes in the vehicle. For example, there may be different types of faults in the vehicle, component failures, abrupt shutdowns, etc. Also, safety techniques utilized by the safety monitoring systems may not be implemented based on specific fault scenarios, and no safety technique is provided to overcome the faults at the early stages of fault detection in the vehicle.

Therefore, there is a requirement to continuously monitor the various failures occurring in the vehicle, and based on that the required safety mechanisms may be implemented.

SUMMARY

In one embodiment, a method for implementing a safety mechanism in a vehicle is disclosed. The method may include determining a fault parameter corresponding to a hazardous fault occurring in a vehicle. The fault parameter may be associated with a severity level of the hazardous fault. The method may include determining an error parameter corresponding to the fault parameter. The method may include determining a set of safety requirements, mapped to the error parameter. The method may further include identifying at least one diagnostic test based on a mapping of the set of safety requirements and the corresponding error parameter with at least one test identifier from a plurality of test identifiers created for a plurality of diagnostic tests. The method may further include executing at least one diagnostic test to determine a predefined component identifier corresponding to a faulty component. The method may further include determining at least one safety mechanism and at least one safety command associated with the faulty component. The method may further include implementing at least one safety mechanism and at least one safety command for mitigating one or more faults associated with the faulty component.

In another embodiment, a system for implementing safety mechanism in a vehicle is disclosed. The system may include a processor and a memory communicatively coupled to the processor. The memory stores processor-executable instructions, which when executed by the processor, cause the processor to determine a fault parameter corresponding to a hazardous fault occurring in a vehicle. The fault parameter is associated with a severity level of the hazardous fault. The processor-executable instructions may cause the processor to determine an error parameter corresponding to the fault parameter. The processor-executable instructions may cause the processor to determine a set of safety requirements, mapped to the error parameter. The processor-executable instructions may cause the processor to identify at least one diagnostic test based on a mapping of the set of safety requirements and the corresponding error parameter with at least one test identifier from the plurality of test identifiers created for a plurality of diagnostic tests. The processor-executable instructions may cause the processor to execute at least one diagnostic test to determine a predefined component identifier corresponding to a faulty component. The processor-executable instructions may cause the processor to determine at least one safety mechanism and at least one safety command associated with the faulty component. The processor-executable instructions may cause the processor to implement at least one safety mechanism and at least one safety command to mitigate one or more faults associated with the faulty component.

In another embodiment, a non-transitory computer-readable medium storing computer-executable instructions for implementing safety mechanism in a vehicle is disclosed. The stored instructions, when executed by a processor, may cause the processor to determine a fault parameter corresponding to a hazardous fault occurring in a vehicle. The fault parameter may be associated with a severity level of the hazardous fault. The operations may further include determining an error parameter corresponding to the fault parameter. The operations may further include determining a set of safety requirements, mapped to the error parameter. The operations may further include identifying at least one diagnostic test based on a mapping of the set of safety requirements and the corresponding error parameter with at least one test identifier from a plurality of test identifiers created for a plurality of diagnostic tests. The operations may further include executing at least one diagnostic test to determine a predefined identifier corresponding to a faulty component. The operations may further include determining at least one safety mechanism and at least one safety command associated with the faulty component. The operations may further include implementing at least one safety mechanism and at least one safety command to mitigate one or more faults associated with the faulty component.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 illustrates a table depicting a plurality of assessments of a sensor transformed data, in accordance with some embodiments of the present disclosure.

FIGS. 5A-5B illustrates a table depicting classifications of fault parameters, in accordance with some embodiments of the present disclosure.

FIG. 6 illustrates a table depicting safety criteria corresponding to fault parameters, in accordance with some embodiments of the present disclosure.

FIGS. 7A-7B illustrates a table depicting at least one error parameter corresponding to the fault parameters, in accordance with some embodiments of the present disclosure.

FIG. 8 illustrates a table depicting safety requirements corresponding to the error parameter, in accordance with some embodiments of the present disclosure.

FIG. 9 illustrates a table depicting a predefined test identifier corresponding to the safety requirement, in accordance with some embodiments of the present disclosure.

FIG. 10 illustrates a table depicting at least one effect parameter corresponding to the fault parameters, in accordance with some embodiments of the present disclosure.

FIG. 11 illustrates a table representing at least one safety command corresponding to the effect parameter, in accordance with some embodiments of the present disclosure.

FIG. 12 illustrates a table representing at least one safety command corresponding to a predefined component identifier of a faulty component, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
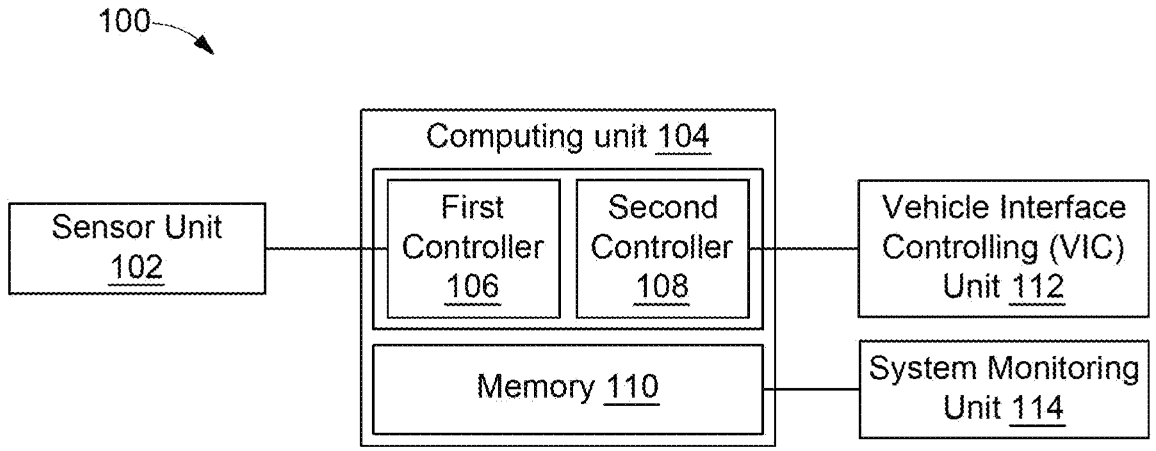
FIG. 1 illustrates a block diagram of an exemplary system for implementing a safety mechanism in a vehicle, in accordance with some embodiments of the present disclosure.

Referring now to FIG. 1, a block diagram of an exemplary system 100 for implementing functional safety of a vehicle is illustrated, in accordance with some embodiments of the present disclosure. The system 100 may include a sensor unit 102, a computing unit 104, a vehicle interface controlling (hereinafter referred to as, VIC) unit 112, and a system monitoring unit 114. The system 100 may be capable of fault management in the vehicle by implementing, via the computing unit 104, a plurality of safety mechanisms and a plurality of safety commands associated with a plurality of faulty components of the vehicle. Further, the system 100 may be implemented in, but not limited to autonomous, semi-autonomous, or fully manual vehicles, aircraft, ships, robots, and the like.

The sensor unit 102 may include a plurality of sensors, which may include, but not limited to voltage sensors, leakage sensors, temperature sensors, aerosol sensors, pressure sensors, gas sensors, and the like. The plurality of sensors may be installed in a plurality of components of the vehicle and communicably coupled to the computing unit 104. Further, the sensor unit 102 may be configured to generate sensor data using the plurality of sensors and may be configured to transmit the sensor data generated, to the computing unit 104. The computing unit 104 may be configured to transform the sensor data to a sensor transformed data, which may be processed by various units as explained hereinafter, to determine faults within the vehicle.

The computing unit 104 may be implemented as one or more controllers, such as for example, a first controller 106 and a second controller 108. Each of the first controller 106 and the second controller 108 may include a processor (not shown in the figure) and a memory 110. The memory 110 may store processor-executable instructions that, when executed by the processor of the computing unit 104, may cause the computing unit 104 to implement at least one safety mechanism in the vehicle. The memory 110 may include a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

Furthermore, the computing unit 104 may be communicably connected to the sensor unit 102, the VIC unit 112 and the system monitoring unit 114 via a communication network. The first controller 106 may receive sensor data from the plurality of sensors, and the second controller 108 may be configured to receive vehicle information data from the VIC unit 112. Further, the second controller 108 may be configured to determine the health status of the VIC unit 112 based on the vehicle information data. The communication network may be implemented as an intra-vehicular communication network that may include, but may not be limited to, CAN (Controlled Area Network), CAN FD (Controlled Area Network Flexible Data-Rate), LIN (Local Interconnect Network), local area network (LAN), wide area network (WAN), Ethernet, PCIe interface, and the like.

The system monitoring unit 114 may be configured to identify at least one faulty component in the vehicle based on the execution of the set of instructions stored in the memory 110. Based on the at least one faulty component identified, the computing unit 104 with the system monitoring unit 114 may implement at least one safety mechanism and at least one safety command to mitigate the faults occurring in the faulty component. This is explained hereinafter.

The computing unit 104 may determine a fault parameter corresponding to a hazardous fault occurring in a vehicle. The fault parameter may be associated with a severity level of the hazardous fault. The hazardous fault may be determined by the implementation of one or more steps by the computing unit 104. Further, the one or more steps may be initiated by pre-processing and implementing a plurality of predefined assessments on the sensor transformed data. Based on the outcome of the implementation of the plurality of predefined assessments, the computing unit 104 may be configured to generate the fault parameter.

The computing unit 104 may determine an error parameter corresponding to the fault parameter. Upon determining the error parameter, the computing unit 104 may determine the set of safety requirements mapped to the error parameter. The set of safety requirements may include a hardware safety requirement (hereinafter referred to as HSR) and a software safety requirement (hereinafter referred to as SSR).

The computing unit 104 may identify at least one diagnostic test based on a mapping of the set of safety requirements and the corresponding error parameter with at least one identifier (hereinafter referred to as 'ID of a diagnostic test,' or 'test IDs') from a plurality of test identifiers created for a plurality of diagnostic tests. On identification of the at least one test IDs, the computing unit 104 may execute the at least one diagnostic test corresponding to the plurality of test identifiers to determine a predefined component ID corresponding to a faulty component. Further, the computing unit 104 may determine at least one safety mechanism and at least one safety command associated with the faulty component corresponding to the predefined component ID. Further, the computing unit 104 may determine and implement the at least one safety mechanism and the at least one safety command to mitigate the faults associated with the faulty component. This is explained in detail, hereinafter.

Figure 2:
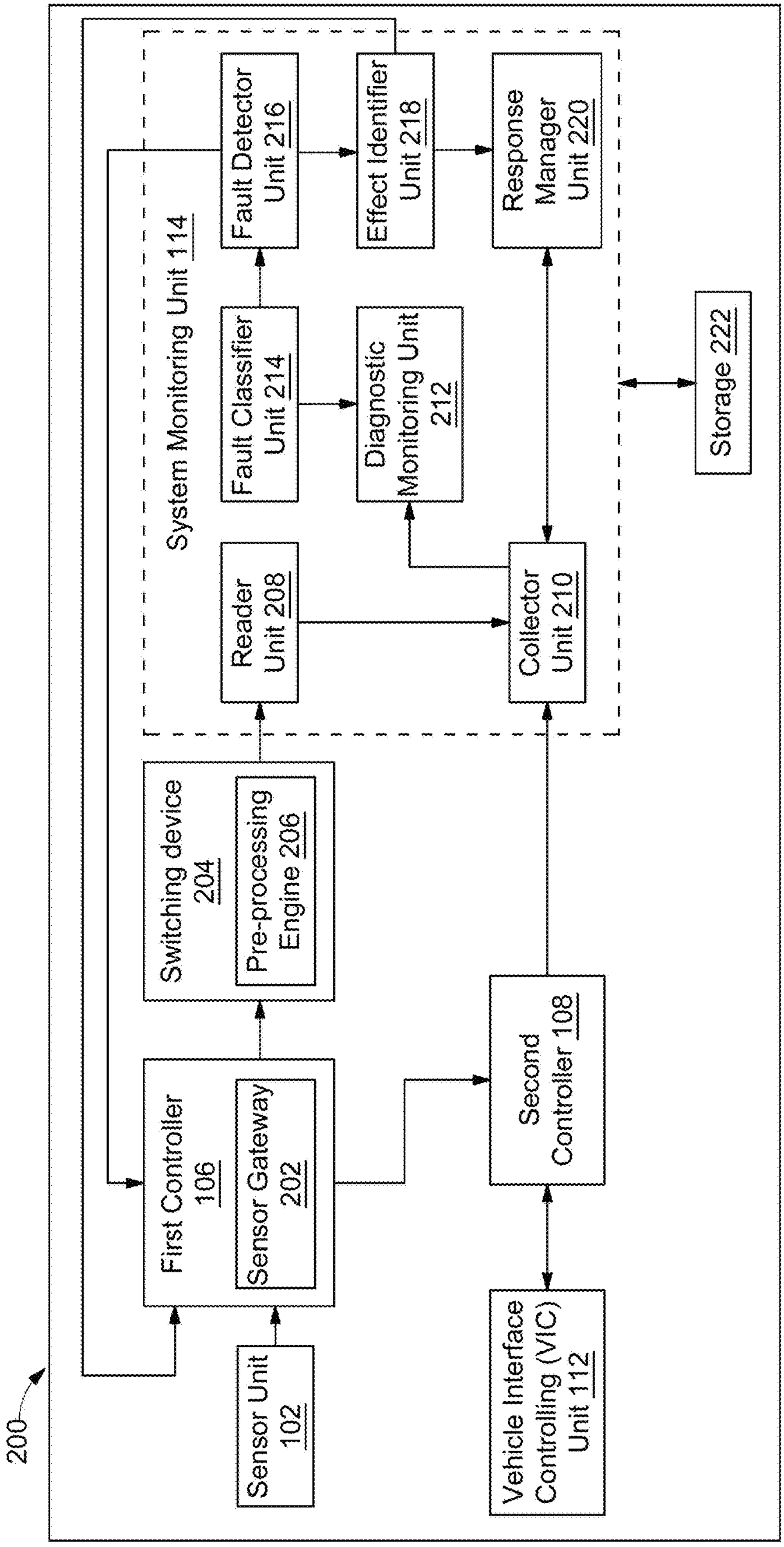
FIG. 2 is a functional block diagram of an exemplary system for implementing safety mechanism in the vehicle, in accordance with some embodiments of the present disclosure.

Referring now to FIG. 2, a functional block diagram 200 of the system 100 for implementing safety mechanism in the vehicle is illustrated, in accordance with some embodiments of the present disclosure. FIG. 2 is explained in conjunction with FIG. 1. As explained earlier, the system 100 may include the sensor unit 102, the computing unit 104, the memory 110, the VIC unit 112, the system monitoring unit 114, and a switching device 204. Further, the computing unit 104 may include the first controller 106 and the second controller 108. The first controller 106 may include a sensor gateway 202. The switching device 204 may include a pre-processing engine 206. Further, the system monitoring unit 114 may include a reader unit 208, a collector unit 210, a diagnostic monitoring unit 212, a fault classifier unit 214, a fault detector unit 216, an effect identifier unit 218, and a response manager unit 220. Further, each unit of the system monitoring unit 114 may be communicably connected to a storage 222.

The system 100 may be configured to determine the fault parameter occurring on various components. Based on the fault parameter, the system 100 via the first controller 106 and the second controller 108 may implement at least one safety mechanism and at least one safety command on the faulty component.

Further, the system monitoring unit 114 may be communicably connected to the first controller 106 and the second controller 108. The first controller 106 may be communicably connected to the system monitoring unit 114 via the switching device 204. Further, the sensor gateway 202 may receive real-time sensor data related to the environment of the vehicle. Further, the sensor gateway 202 may transmit the sensor data to the switching device 204.

The switching device 204 may include the pre-processing engine 206. Further, the pre-processing engine 206 may be operatively connected to the first controller 106 and the system monitoring unit 114. Further, the pre-processing engine 206 may be configured to process or convert the sensor data into a common format sensor data using techniques commonly known in the art. As such, the common format sensor data may be suitable for an Ethernet/PCIe interface (i.e., a communication network). Accordingly, the common format sensor data may be transmitted by the switching device 204 to the system monitoring unit 114.

The reader unit 208 may be connected to, and may be configured to receive the common format sensor data in the common packet format from the switching device 204. The sensor data, as explained earlier, maybe transformed into common format sensor data. Further, the reader unit 208 may be configured to transform the sensor data (in the common format) into sensor transformed data in a UDP or TCP/IP packet format using various techniques known in the art.

The sensor transformed data, may include a payload header, a payload data, and a payload trailer. In an exemplary embodiment, the payload header may include a set of fields that may include, a protocol version, header length, payload type, timestamp, source, and destination addresses, etc. Further, the payload data may include for example, but not limited to, a plurality of measurement fields provided in the packet payload, and the like. Further, each of the measurement fields may include the sensor measurement data (Measurement ID and Value) along with attributes of the sensor unit 102 from which the data may be received. For example, attributes of the sensor unit 102 may include but are not limited to, model number, serial number, Mac address, IP address, Source, Destination and Diagnostic Ports of the sensor, and like. The measured attributes/values in the payload data may be utilized for the identification of fault. The payload trailer may support End-to-End communication protection, ensuring data integrity and authenticity. The contents of the payload trailer may be opaque and application-specific, for example, trailer length, CRC, end marker, etc. The payload trailer may also include data for example, but not limited to, message integrity assertion, authentication check and OEM specific data, and the like.

The collector unit 210 may receive the sensor transformed data from the reader unit 208. The collector unit 210, upon receipt of the sensor transformed data, may be configured to periodically transmit the sensor transformed data to the diagnostic monitoring unit 212. Moreover, the collector unit 210 may be communicably coupled to the VIC unit 112, and configured to receive real-time vehicle information from the VIC unit 112. Particularly, the second controller 108 may be communicably coupled to the VIC unit 112. Therefore, the VIC unit 112 may be configured to transmit the real-time vehicle information to the second controller 108, and the real-time vehicle information may be acquired by the collector unit 210 therefrom.

The vehicle information may include, but not limited to, operation status for the vehicle such as current acceleration/deacceleration, steering angle actuation for the actuator unit of the steering assembly, other real-time operational conditions of the vehicle, and the like. The collector unit 210 may further receive health status data for the VIC unit 112, i.e., if the VIC unit 112 may be functioning, or not, through the second controller 108. The vehicle information data and the health status data may be stored by the collector unit 210 and may be acquired by the response manager unit 220 based on a requirement.

Upon receipt from the collector unit 210, the diagnostic monitoring unit 212 may periodically receive the sensor transformed data, i.e., in every few milliseconds. Further, the diagnostic monitoring unit 212 may be configured to perform a plurality of predefined assessments of the sensor transformed data from a plurality of primary assessments and a plurality of secondary assessments. The plurality of primary assessments and the plurality of secondary assessments may be stored in a repository (not shown in FIG. 2) of the diagnostic monitoring unit 212. Further, the diagnostic monitoring unit 212 may implement the plurality of primary assessments and the plurality of secondary assessments on the payload data to identify a fault parameter. Further, the payload data within the sensor transformed data may be processed through the plurality of primary assessments. Further, in case, the results of the plurality of primary assessments may be negative, no further steps may be executed on the sensor transformed data. Accordingly, the diagnostic monitoring unit 212 may move to next sensor transformed data to perform the plurality of predefined assessments.

If the result of the plurality of primary assessments is positive, the diagnostic monitoring unit 212 may identify a set of secondary assessments corresponding to the primary assessment to further evaluate the payload data within the sensor transformed data. Further, the plurality of secondary assessments may be executed on the payload data of the sensor transformed data received by the diagnostic monitoring unit 212.

Further, in case, any of the outcomes of the plurality of secondary assessments may be positive, an output such in a form of a fault parameter may be determined. Also, if the outcome of the plurality of secondary assessments may be negative then a false positive for a fault may be determined and no further assessments would be executed. Further, the fault parameter may include a plurality of fault parameter IDs. The fault parameter IDs may include, but is not limited to unique identifications, irrespective of any factor (i.e., location, component, etc.), that may be utilized for the proper identification of faulty components/sensors of the vehicle. For example, the fault parameter IDs may be represented as FltCode1, FltCode2, to FltCodeN.

Each of the fault parameter IDs may correspond to a fault type such as, but not limited to, no detection, false alarm, signal dropout, incorrect range measurement, target merging, shadowing, and the like. For example, for the fault parameter "FltCode2", the fault type may be determined as "false alarm". Further, the diagnostic monitoring unit 212 may transmit the determined fault parameter to the fault classifier unit 214.

Further, the fault classifier unit 214 may receive the fault parameter from the diagnostic monitoring unit 212. Further, the fault classifier unit 214 may transmit the fault parameter to the storage 222, and may be configured to classify the fault parameter into a hazardous fault and a non-hazardous fault. The fault classifier unit 214 may be configured to look up for the fault parameter in the storage 222, and may be configured to map a predefined fault rating, which may include Automotive Safety Integrity Level (ASIL) rating corresponding to the fault parameter.

The hazardous fault may be associated with a severity level above a threshold limit. It should be noted that the severity level above the threshold limit may cause major faults in the vehicle, which may damage the vehicle and risk the life of passengers in the vehicle. The hazardous fault may be determined and based on the severity, the fault classifier unit 214 may assign the corresponding ASIL rating from a set of ASIL ratings from the storage 222.

If the fault parameter may be classified as a hazardous fault, the predefined fault rating such as ASIL A, ASIL B, ASIL C, or ASIL D may be assigned to the fault parameter. In contrast, if the fault parameter is classified into the non-hazardous fault, the predefined fault rating such as Quality Management-No Effect (QM-NE), Quality Management-Not a part (QM-NP) or Quality Management-Safe Failure (QM-SF) may be assigned to the fault parameter.

In an exemplary embodiment, the predefined fault rating ASIL A may represent lowest level of safety integrity, for example, high sensitivity to external electromagnetic interference disrupting radar sensor operation. Further, the predefined fault rating ASIL B faults may be more serious and may involve a higher level of safety integrity than the predefined fault rating ASIL A, for example, inaccurate velocity measurements by speed sensors. Further, the predefined fault rating ASIL C represents a higher safety integrity level as compared to the predefined fault rating ASIL B and may address faults that may include more significant consequences, for example, detecting non-existent objects or artifacts by sensors which results in false alarms. Moreover, the predefined fault rating ASIL D represents the highest level of safety integrity, addressing faults with the most severe potential consequences, for example, sensor occlusion, in which the field of view of radar sensors is obstructed by physical objects, thus leading to missed detections.

In an exemplary embodiment, for non-hazardous fault, the predefined fault rating such as ASIL QM-NE may represent a rating for a fault parameter corresponding to a component of the vehicle during failure which may have no impact on the safety requirement of the vehicle. For example, a resistor is used to drive an on-off relay coil in the vehicle internal light system. Any change in the resistance value of the resistor has no impact on the functionality of the vehicle internal lighting system and the vehicle continues to operate. Such scenarios are referred to as "No-effect" and it is considered "safe" by the current design standards for designing and maintaining safety-related systems, i.e., IEC61508 definition. In contrast, if the same resistor has an open circuit failure or a short circuit failure, then there would be an impact on the safety requirement of the vehicle as power failures or burning of component(s) may result. Such cases are defined as hazardous faults and would be assigned the hazardous ASIL rating (for example, ASIL A/ASIL B/ASIL C/ASIL D).

The predefined fault rating ASIL QM-NP may represent a rating for a fault parameter corresponding to a failed component which may not be a part of the safety requirement but may be a part of a circuit diagram for completeness of the vehicle functioning. For instance, multiple Light-Emitting-Diode (LED) indicators are used in the vehicle internal light system. Upon failure of such LEDs in the vehicle internal light system, LEDs do not light up during vehicle operation however it has no impact on the safety requirement of the vehicle. In fact, any of the failure modes of the LEDs are unlikely to impact the performance and safety requirements of the vehicle. This category of the components is referred to as "Not a part" and considered as "safe" by the current IEC61508 definition.

The predefined fault rating ASIL QM-SF may represent a rating for a fault parameter corresponding to a failed component which may be immediately detected, and a predefined fault tolerant arrangement (like a circuit breaker) may be implemented to overcome the fault. Consequently, the fault classifier unit 214 may transmit the fault parameter and the corresponding ASIL rating(s) to the fault detector unit 216.

The fault detector unit 216 may receive the fault parameter and the corresponding predefined rating. The fault detector unit 216 may transmit the fault parameter and the corresponding predefined rating to the storage 222. The fault detector unit 216, based on the fault parameter and the corresponding ASIL rating(s), may be configured to determine an error parameter corresponding to the fault parameter from the storage 222. For example, when the predefined fault rating ASIL A is determined, the error parameter corresponding to the predefined fault rating ASIL A may be determined. The error parameter may indicate failures of possible components within the vehicle. Typically, a single component may exhibit a plurality of failure modes, and each failure mode may be represented by a unique error parameter. The failure modes may result due to the contribution of various factors for failure of component(s) and may include human error such as but not limited to design flaws, operational mistakes, management lapses, maintenance-induced failures, specification errors, and the like.

Upon determining the error parameter, the fault detector unit 216 may be configured to map the determined error parameter to a set of safety requirements stored in the storage 222. As explained earlier, the set of safety requirements may the HSRs and the SSRs.

The HSRs may be defined based on the technical safety requirements (hereinafter referred to as TSR) of hardware components. The TSR, which may be initially designated for both hardware (hereinafter referred to as HW) and software (hereinafter referred to as SW), may be revised to produce safety requirements solely for hardware. The HSRs may undergo further refinement considering hardware design limitations. The HSRs may encompass safety techniques along with their characteristics, including parameters like Fault Tolerant Time Interval or multiple-point fault detection interval of the safety techniques.

Further, the SSRs may be defined based on TSR related to software. The SSRs may include various functions that facilitate the system monitoring unit 114 in attaining or preserving a secure state, i.e., a state in which the faults are mitigated. The functions may include detecting, indicating, and managing faults in safety-related hardware components or the software itself. Additionally, the SSRs may include functions related to time-critical operations, timing constraints, and the operating mode of the vehicle.

The fault detector unit 216 may identify at least one diagnostic test. The at least one diagnostic test may be identified based on a mapping of the set of safety requirements and the corresponding error parameter with at least one test ID. The test ID(s) herein may belong to a plurality of test ID(s) created for a plurality of diagnostic tests. Further, the plurality of diagnostic tests when identified, may be executed by the fault detector unit 216 to determine a predefined component ID corresponding to a faulty component. In other words, execution of the plurality of diagnostic tests may result in the identification of the faulty component in the vehicle.

Additionally, the fault detector unit 216 may identify a predefined safety criteria corresponding to the fault parameter and the corresponding predefined fault rating. Based on the fault parameter, and the predefined safety criteria corresponding to the fault parameter, a degree of impact may be identified. Further, the effect identifier unit 218 may be configured to determine the degree of impact, or degree of effect corresponding to the fault parameter, and the predefined safety criteria corresponding to the fault parameter. The degree of impact may be determined based on at least one effect parameter.

The effect identifier unit 218 may determine at least one effect parameter of the fault parameter (hazardous fault). Moreover, the effect identifier unit 218 may receive the predefined safety criteria along with the HSRs and the SSRs, and the predefined component identifier from the fault detector unit 216. The effect identifier unit 218 may transmit the predefined safety criteria to the storage 222 for determining the corresponding effect parameter associated with the fault parameter. The corresponding effect parameter may include effect IDs to which the predefined safety criteria may be mapped by the effect identifier unit 218. The effect parameter may represent a wide range of effects that may be linked to the fault parameter and corresponding to at least one safety mechanism. The effect parameter may include, but not limited to incorrect detection of objects such as vehicles, pedestrians, or obstacles, misjudging the precise location of detected objects, failure to accurately predict the movement paths of detected objects, in detecting objects, leading to reduced reaction time for autonomous vehicle systems, and like. Furthermore, at least one effect parameter may be transmitted to the response manager unit 220 along with the received safety requirements and the predefined component ID of the faulty component. Also, the effect identifier unit 218 may transmit the same data to the storage 222 for record keeping and future analysis.

The response manager unit 220 may determine at least one safety mechanism and at least one safety command to mitigate the faults occurring in the vehicle. Particularly, the response manager unit 220 may receive at least one effect parameter, the predefined component ID, and the set of safety requirements (i.e., the HSRs and the SSRs) from the effect identifier unit 218. Consequently, the response manager unit 220 may determine at least one safety mechanism and at least one safety command based on the HSR, the SSR, and the predefined component ID. Further, the effect identifier unit 218 may transmit at least one safety mechanism and at least one safety command to the response manager unit 220.

Upon receipt of the at least one safety mechanism and at least one safety command, the response manager unit 220 may be configured to generate a request to the collector unit 210 to determine the real-time vehicle information and the health status of the VIC unit 112. The health status of the VIC unit 112 may be determined based on the vehicle information data received from the second controller 108 and the reader unit 208.

Upon receipt of the real-time vehicle information and the health status of the VIC unit 112, the response manager unit 220 may issue a safety command selected from the at least one safety command to the second controller 108 to mitigate the effect of the fault on the vehicle operation, including forthcoming emergencies. The safety command may include Safe-Stop-Action (SSA), Autonomy Safe Action (ASA), Immediate Maintenance Action (IMA), and Vehicle Stop Action (VSA).

In an embodiment, the safety mechanism and the corresponding safety command may be implemented within a predefined time period by initiating the timer for the predefined time period upon determining the hazardous fault. It is to be noted that, the early implementation of the safety mechanism and the corresponding safety command may be required for the management of the faulty component.

Accordingly, the response manager unit 220 may implement the at least one safety mechanism and the corresponding safety command within the predefined time period.

The response manager unit 220 may implement a timer for the predefined time period, to implement the safety command and the safety mechanism before the occurrence of the fault. The predefined time period may include a fault-tolerant time interval (hereinafter referred to as FTTI). The FTTI may determine the maximum time for the hazardous fault to be mitigated by the system before the hazard occurs. The FTTI may include a diagnostic test interval (hereinafter referred to as DTI) and a fault reaction time interval (hereinafter referred to as FRTI). The DTI may include a predefined time interval to diagnose the fault, i.e., within this time interval, at least one diagnostic test may be implemented. Further, the FRTI may include a predefined time period within which the safety mechanism and the safety command may be implemented.

In an embodiment, there may be scenarios where the fault may not be present in the system, instead the fault may be occurring in the external sensors of the vehicle. In such case, no predefined component ID and the set of SSRs may be received, resulting in no determination of any safety mechanism from the response manager unit 220.

In an exemplary scenario, when the fault parameter may not be present in the sensor unit 102 of the vehicle, and instead, the fault may be present in the system or sensor data transmission path. In such a case, no effect parameter may be received. Consequently, the response manager unit 220 may not determine any safety command. Further, if the received health status indicates that the second controller 108 or the VIC unit 112 is not in a healthy state to implement any safety command, then the response manager unit 220 may not determine any safety commands.

The first controller 106 of the computing unit 104 may receive the at least one safety mechanism from the response manager unit 220 and implement a safety mechanism from the at least one safety mechanism to the identified faulty component. Similarly, the second controller 108 may receive at least one safety command from the response manager unit 220. Also, the second controller 108 may receive the health status for the fault parameter and implement the corresponding safety command through the VIC unit 112 of the vehicle. Accordingly, the second controller 108 may transmit the received status to the collector unit 210 of the system monitoring unit 114 for future reference, thus generating a feedback system.

It should be noted that all such aforementioned units 208-220 may be represented as a single unit or a combination of different units. Further, as will be appreciated by those skilled in the art, each of the units 208-220 may reside, in whole or in parts, on one device or multiple devices in communication with each other. In some embodiments, each of the units 208-220 may be implemented as a dedicated hardware circuit comprising custom application-specific integrated circuits (ASIC) or gate arrays, off-the-shelf semiconductors such as logic chips, transistors, or other discrete components. Each of the units 208-220 may also be implemented in a programmable hardware device such as a field programmable gate array (FGPA), programmable array logic, programmable logic device, and so forth. Alternatively, each of the units 208-220 may be implemented in software for execution by various types of processors (e.g. processor). An identified unit of executable code may, for instance, include one or more physical or logical blocks of computer instructions, which may, for instance, be organized as an object, procedure, function, or other construct. Nevertheless, the executables of an identified unit or component need not be physically located together but may include disparate instructions stored in different locations which, when joined logically together, include the unit and achieve the stated purpose of the unit. Indeed, a unit of executable code could be a single instruction, or many instructions, and may even be distributed over several different code segments, among different applications, and across several memory devices.

As will be appreciated by one skilled in the art, a variety of processes may be employed for implementing at least one safety mechanism in the vehicle. For example, the exemplary system and the associated computing unit 104 may implement at least one safety mechanism by the processes discussed herein. In particular, as will be appreciated by those of ordinary skill in the art, control logic and/or automated routines for performing the techniques and steps described herein may be implemented by the system 100 and the associated computing unit 104 either by hardware, software, or combinations of hardware and software. For example, suitable code may be accessed and executed by the processor on the system 100 to perform some or all of the techniques described herein. Similarly, application-specific integrated circuits (ASICs) configured to perform some or all of the processes described herein may be included in the processor on the system.

Figure 3:
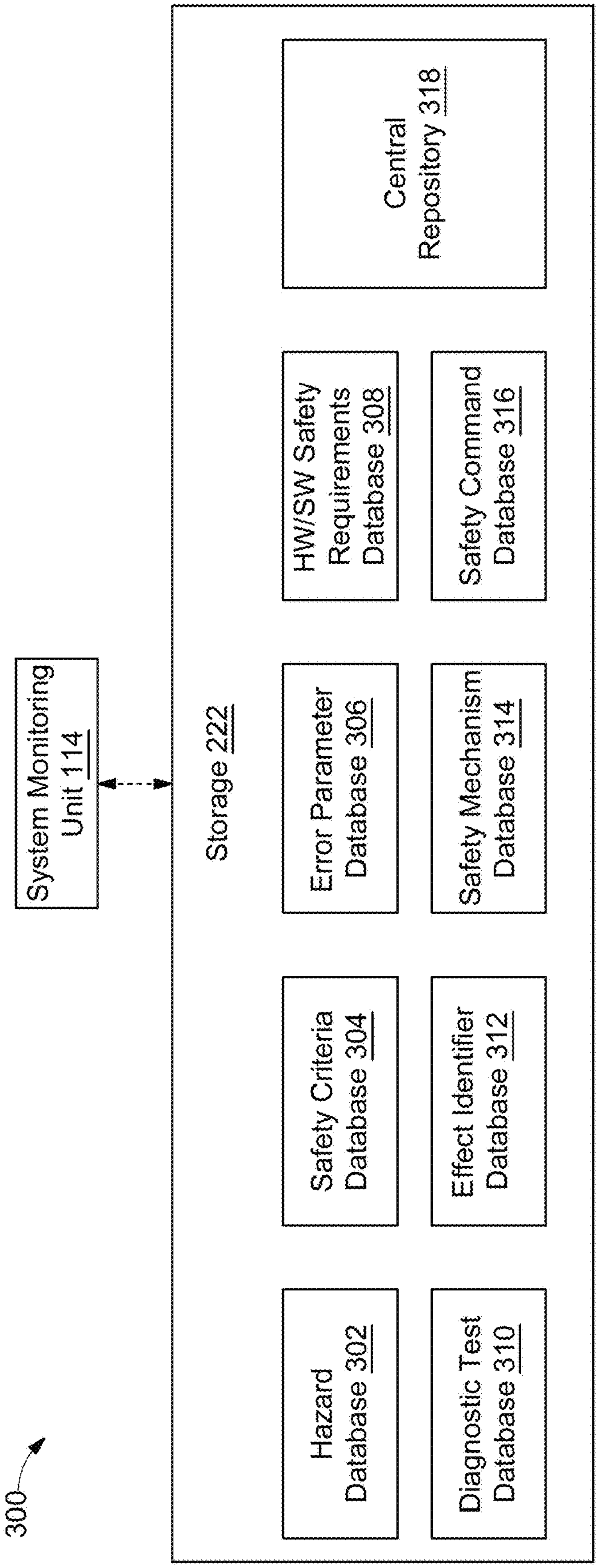
FIG. 3 illustrates a functional block diagram of the system monitoring unit connected with a storage, in accordance with some embodiments of the present disclosure.

Referring now to FIG. 3, a functional block diagram 300 of system monitoring unit 114 connected with a central repository is illustrated, in accordance with some embodiments of the present disclosure. FIG. 3 is explained in conjunction with FIG. 2. The system monitoring unit 114 may be connected to the storage 222. In an embodiment, the storage 222 may include a hazard database 302, a safety criteria database 304, an error parameter database 306, a HW/SW safety requirements database 308, a diagnostic test database 310, an effect identifier database 312, a safety mechanism database 314, a safety command database 316 and a central repository 318.

The hazard database 302 may include a comprehensive list of faults, breakdowns, and/or malfunctions of the components, and the mapping of fault parameters with ASIL rating(s). Further, the computing unit 104, via the fault classifier unit 214 may store the fault parameter in the hazard database 302. Accordingly, the corresponding ASIL rating(s) may be retrieved from the hazard database 302.

The safety criteria database 304 may be defined to ensure that risks may be managed effectively and that the system 100 operates within the safety limits. The safety criteria database 304 may include the mapping of the fault parameter and corresponding predefined fault rating (ASIL rating(s)) with the predefined safety criteria. In an embodiment, the predefined safety criteria may include a plurality of safety criteria IDs. The computing unit 104, with the fault detector unit 216 may be configured to receive the fault parameter and corresponding predefined fault ratings from the safety criteria database 304. Further, the fault detector unit 216 may obtain the corresponding safety criteria IDs from the safety criteria database 304 based on the fault parameter.

The error parameter database 306 may include a plurality of error parameters, each error parameter indicating a plurality of failures of possible components within the vehicle. Typically, a single component may exhibit several failure modes, each represented by a unique error parameter ID. The error parameter database 306 may include the mapping of the fault parameter ID(s) with error parameter IDs of at least one error parameter. Therefore, the computing unit 104, via the fault detector unit 216 may obtain error parameter ID from the error parameter database 306 based on the fault parameter.

The HW/SW safety requirements database 308 may include the set of safety requirements. The set of safety requirements may include HSR IDs and the SSR IDs. The HW/SW safety requirements database 308 may include the mapping of at least one error parameter IDs with the HSR/SSR IDs. upon obtaining the error parameter ID, the computing unit 104, via the fault detector unit 216 and based on the error parameter ID may obtain corresponding HSR/SSR IDs from the HW/SW safety requirements database 308.

The diagnostic test database 310 may include a mapping of the HSR/SSR ID(s) and the corresponding error parameter ID with at least one diagnostic test from the plurality of diagnostic tests. In an embodiment, at least one diagnostic test may be identified based on at least one test ID from the plurality of test IDs created for the plurality of diagnostic tests. Further, the fault detector unit 216 may be configured to obtain a diagnostic test from the plurality of diagnostic tests, corresponding to the HSR/SSR IDs and the corresponding error parameter ID.

The effect identifier database 312 may include the plurality of safety criteria IDs and the plurality of effect parameter IDs. Particularly, the effect identifier database 312 may include mapping of plurality of safety criteria IDs and the plurality of effect parameter IDs. The effect identifier database 312 may receive the plurality of safety criteria IDs from the effect identifier unit 218. Further, the corresponding effect parameter ID may be transmitted to the effect identifier unit 218 for determining at least one test ID from the plurality of test IDs corresponding to the diagnostic tests. The at least one diagnostic tests may be configured to determine the predefined component ID corresponding to the faulty component.

The safety mechanism database 314 may include the safety mechanism IDs corresponding to each safety mechanism. The safety mechanism database 314 may include the mapping of the HSR/SSR IDs and the corresponding component IDs with safety mechanism IDs. Accordingly, the computing unit 104 with the response manager unit 220 may be configured to determine safety mechanism IDs from the safety mechanism database 314, based on the HSR/SSR IDs and the corresponding component IDs.

The safety command database 316 may include at least one safety command IDs corresponding to at least one safety command. The safety command database 316 may include mapping of the effect parameter IDs with the safety command IDs. Further, the computing unit 104, via the response manager unit 220 may be configured to obtain a safety command ID corresponding to the effect parameter ID from the safety command database 316.

In an embodiment, the storage may include the central repository 318. The central repository 318 may receive and store the fault parameter and corresponding predefined fault ratings (herein, non-hazardous (ASIL rating(s)) from the fault classifier unit 214. The central repository 318 also receives, at least one effect parameter IDs and the corresponding safety criteria IDs from the effect identifier unit 218. Further, the central repository 318 may also send real-time data for safety goal IDs to the effect identifier unit 218. The data of the central repository 318 may be utilized for implementing the safety command on the faulty component of the vehicle.

Referring now to FIG. 4, a table 400 depicting a plurality of assessments of the sensor transformed data is illustrated, in accordance with some embodiments of the present disclosure. The table 400 illustrated herein may be predefined and embedded in the storage 222 during the design stage of the vehicle. In an embodiment, the table 400 may be configured to store fault parameter and ASIL rating corresponding to the fault parameters. The fault parameter may include the plurality of fault parameter IDs determined by implementing the plurality of assessments of the sensor transformed data by the computing unit 104 using the fault classifier unit 214. The fault parameter IDs may include, but is not limited to unique identifications, irrespective of any factor (i.e., location, component, etc.), that may assist with the proper identification of faulty components/sensors of the vehicle. The fault IDs may be in a bit-wise hexadecimal format. For example, the fault parameter IDs may be represented as FltCode1, FltCode2, to FltCodeN.

In an exemplary embodiment, when one of the primary assessments may be executed and the result may be object detection assessment 1, then the secondary assessment may be implemented. When the result of the secondary assessment may be “no detection”, a fault parameter “FltCode1” may be determined by the computing unit 104 using the fault classifier unit 214. In contrast, when the execution of the primary assessment may be an object detection assessment 2, and the type of the secondary assessment may be determined to be an angle accuracy assessment, as a result, the computing unit 104 using the fault classifier unit 214 may assign “FltCode7” depicting a partial occlusion handling.

Similarly, when the execution of the primary assessment results in the determination of object detection assessment 3, and the type of the secondary assessment may be determined to be obstruction assessment, the computing unit 104 using the fault classifier unit 214 may determine the fault parameter “FltCode13” depicting the sensor occlusion. Similarly, when the execution of the primary assessment may be an interference assessment, and the type of the secondary assessment may be determined to be an interference disruption assessment, accordingly, the fault parameter “Fltcode15” may be assigned by the by the computing unit 104 using the fault classifier unit 214 depicting interference sensitivity.

Referring now to FIGS. 5A-5B, a table 500 depicting classifications of the fault parameter is illustrated, in accordance with some embodiments of the present disclosure. Further, the table 500 may be stored as a lookup table in the hazard database 302, during the design stages of the vehicle. The table 500 herein, may include a mapping of the fault parameter with the corresponding predefined fault ratings, which may include ASIL rating(s), as explained earlier. Particularly, the table 500 may be configured to store fault parameter IDs and the corresponding predefined fault ratings.

For example, when the fault parameter may be determined to be hazardous faults or non-hazardous faults, the computing unit 104 using the fault classifier unit 214 may look up the corresponding fault parameter ID with the predefined rating. For example, for fault parameter “FltCode1” i.e., the predefined fault rating ASIL A may be determined by the computing unit 104 using the fault classifier unit 214. Further, for the fault parameter “FltCode12” i.e., clutter rejection failure, the computing unit 104 using the fault classifier unit 214 may determine the predefined fault rating ASIL C. Similarly, for the fault parameter “FltCode18” i.e., sensor fusion failure, then the fault classifier unit 214 may determine the predefined fault rating ASIL D.

For instance, for the fault parameter “FltCode31” i.e., low signal-to-noise ratio, the computing unit 104 using the fault classifier unit 214, with the hazard database 302 may determine a predefined fault rating ASIL QM-NE. Similarly, for the fault parameter "FltCode33" i.e., limited angle coverage, then the computing unit 104 using the fault classifier unit 214 with the hazard database 302 may determine the predefined fault rating ASIL QM-NP. Similarly, for the fault parameter "FltCode34" i.e., temporary data packet loss, then the fault classifier unit 214, with the hazard database 302 may determine the predefined fault rating ASIL QM-SF.

Referring now to FIG. 6, a table 600 depicting the safety criteria corresponding to the fault parameters is illustrated, in accordance with some embodiments of the present disclosure. Similar to the table 600 herein may be stored as a lookup table in the safety criteria database 304, during the design stages of the vehicle. The table 600 may store at least one predefined safety criteria, which may include at least one set of predefined safety criteria IDs. The at least one predefined safety criteria IDs may define a desired state or conditions that may be required to be maintained in the vehicle to ensure the safety of the plurality of components and passengers. Therefore, in the safety criteria database 304, the fault parameter may be mapped against the plurality of predefined safety criteria IDs. The plurality of predefined safety criteria IDs may be represented as SG_01, SG_02, to SG_N etc.

For instance, the plurality of predefined safety criteria IDs may be defined corresponding to the fault parameter IDs and the predefined fault ratings in the vehicle. For example, based on the fault parameter "FltCode1" with ASIL C rating, the computing unit 104 using the fault detector unit 216 may look up for a corresponding predefined safety criteria in the table 600. Accordingly, a safety criteria ID SG_01 may be determined. Therefore, the predefined safety criteria may be determined to be "detect obstacles." The safety criteria description for FltCode1 may be to ensure the radar system reliably detects obstacles in the vehicle's path to prevent collisions. Similarly, for the fault parameter "FltCode5" with the predefined fault rating ASIL A, the safety criteria ID "SG_05" may be determined by the computing unit 104 using the fault detector unit 216.

Referring now to FIGS. 7A-7B, a table 700 depicting a plurality of error parameters corresponding to the fault parameters is illustrated, in accordance with some embodiments of the present disclosure. The table 700 may be stored as a lookup table in the error parameter database 306, during the design stages of the vehicle. Further, the table 700 may indicate the error parameters IDs corresponding to the fault parameter IDs. The error parameters may be represented as error parameter IDs, which may further indicate failures of possible components within the vehicle. The computing unit 104 using the fault detector unit 216, may be configured to look up error parameter IDs corresponding to the fault parameter IDs in the table 700. For instance, for the fault parameter "FltCode1" the error parameter ID "ErrCode1" may be determined by the fault detector unit 216. The ErrCode1 may depict a job that does not return within the specified time "time 1". Further, the error description may include hardware processor engine may be hung. Similarly, the fault parameter "FltCode6", the error parameter ID "ErrCode6" may be determined by the computing unit 104 using the fault detector unit 216, which may depict a processor diagnostic failure 2.

Referring now to FIG. 8, a table 800 depicting a set of safety requirements corresponding to the error parameter IDs is illustrated, in accordance with some embodiments of the present disclosure. The table 800, may be stored in the HW/SW safety requirements database 308 during the design stages of the vehicle. As explained earlier, the set of safety requirements may include the HSR and the SSR. Further, the table 800 may be configured to store HSR/SSR IDs corresponding to the error parameter IDs. Accordingly, the computing unit 104 using the fault detector unit 216 may be configured to look up for HSR IDs or the SSR IDs corresponding to the error parameter IDs in the table 800. For instance, for the error parameter ID "ErrCode1", the safety requirement description may depict that running a real-time operating system (RTOS) is a must. Accordingly, the software safety requirement with the SSR ID "SSR1" may be determined by the computing unit 104 using the fault detector unit 216. Similarly, for the error parameter ID "ErrCode5", the safety requirement description may include thermal sensors and an automatic shutdown feature. Such error may require safety requirements for hardware, i.e., HSR ID "HSR1" may be determined by the fault detector unit 216.

Referring now to FIG. 9, a table 900 depicting the predefined test ID corresponding to the safety requirement is illustrated, in accordance with some embodiments of the present disclosure. The table 900 may be stored as a lookup table in the diagnostic test database 310 during the design stages of the vehicle. In an embodiment, the table 900 may be configured to store a plurality of test IDs defining diagnostic tests corresponding to the error parameter IDs and HSR/SSR IDs. Accordingly, to determine a diagnostic test, i.e., to determine a test ID, the computing unit 104 using the fault detector unit 216 may be configured to look up for test ID corresponding to the error parameter IDs and HSR/SSR IDs in the table 900. The plurality of test IDs are represented as TestID1, TestID1, to TestIDN. For instance, for "ErrCode1" with the corresponding software safety requirement "SSR1" and the "ErrCode1", test ID "TestID1" may be determined by the computing unit 104 using the fault detector unit 216. The diagnostic test corresponding to the test ID "TestID1" may be executed by the computing unit 104 to determine the faulty component.

Referring now to FIG. 10, a table 1000 representing the effect parameter corresponding to the fault parameters is illustrated, in accordance with some embodiments of the present disclosure. The table 1000 may be stored as a lookup table in the effect identifier database 312 during the design stages of the vehicle. The table 1000 is configured to store at least one predefined safety criteria IDs corresponding to the at least one effect parameter IDs. Accordingly, the effect identifier unit 218 may be configured to look up an effect parameter ID corresponding to the plurality of safety criteria IDs in the table 1000. For instance, for the plurality of predefined safety criteria IDs i.e., SG_04, SG_10, the effect parameter ID "EffIDX001" may be determined by the computing unit 104 using the effect identifier unit 218. Accordingly, the effect parameter may be determined to be erroneous object detection. Similarly, for safety criteria SG_04 and SG_10, effect parameter ID "EffIDX008" may be determined by the computing unit 104 using the effect identifier unit 218.

Referring now to FIG. 11, a table 1100 representing at least one safety commands corresponding to the at least one effect parameters is illustrated, in accordance with some embodiments of the present disclosure. The table 1100 may be stored in the safety command database 316 during the design stages of the vehicle to include every possible effect corresponding to the effect parameters. In an exemplary embodiment, the table 1100 may illustrate the safety command corresponding to the effect parameter. Particularly, for each effect parameter ID, the table 1100 may store a safety command ID. Further, the computing unit 104 using the response manager unit 220 may look up safety command ID corresponding to the effect parameter ID, to determine safety command to be implemented. The safety command ID may be represented as SCL001, SCL002, to SCL00N, etc. Further, the safety command name may be represented as SSA, ASA, IMA, VSA, etc.

For example, for the effect parameter ID "EffIDX001", a safety command "SCL001" may be mapped in the table 1100, and determined by the computing unit 104 using the response manager unit 220. The safety command SCL001 may be named SSA-1, depicting the command for an in-lane stop at 0.4 g deceleration, following a predetermined trajectory with hazard lamp activation by VIC. Further, for the effect parameter ID "EffIDX002" a safety command "SCL002" may be mapped in the table 1100 and determined by the computing unit 104 using the response manager unit 220. The safety command SCL002 may be named SSA-2, depicting the command for an in-lane stop at 1 g deceleration with automatic hazard lamp activation by VIC unit 112 to alert other drivers. In an exemplary embodiment, an SSA (Safe-Stop-Action) safety command may be utilized when there may be a need for action based on a predetermined safety trajectory conducted by the Drive-By-Wire (DBW) system without any additional instructions from the computing unit 104. The SSA commands focus on safety during specific situations. This action is initiated when a fault affects the vehicle confidence in generating future "safe" trajectories and may ensure the safety of the passengers, other road users, and the vehicle in case of system failure or emergency.

Similarly, for the effect parameter ID "EffIDX003", a safety command "SCL003" may be mapped in the table 1100 and determined by the computing unit 104 using the response manager unit 220. The safety command SCL003 may be named ASA-3, depicting command for in-lane stop with 0.1 g to 0.4 g deceleration, hazard lamp activation, parking brakes application, gear shifting to park, and door unlocking. Further, the ASA (Autonomy Safe Action) may refer to a procedure that the vehicle may follow to safely bring itself to a stop when it encounters certain conditions or situations. The ASA command may be typically initiated autonomously without human intervention. The ASA commands may be related to safety actions taken by the vehicle itself. The ASA command includes procedures for in-lane stops, controlled deceleration, hazard lamp activation, parking brake application, gear shifting to park, and door unlocking.

Similarly, the effect parameter ID "EffIDX013", and a safety command "SCL008" may be mapped in the table 1100 and determined by the response manager unit 220. The safety command SCL008 may be named IMA-1, depicting a command for the completion of an ongoing passenger mission, unlocking doors, and returning to depot for maintenance and refueling. Also, IMA (Immediate Maintenance Action) refers to a specific safety measure initiated for the vehicle, such as the HMG (Human Machine Interface), without any involvement from the autonomous system. The IMA commands focus primarily on the safety of passengers. The IMA may be taken in response to various situations, including engine, brake, or steering failures, as well as the absence of signals from the DBW system and it serves as a prompt response to ensure the safety and well-being of the vehicle and its occupants.

Also, for the effect parameter ID "EffIDX019", a safety command "SCL002" may be mapped in the table 1100, and determined by the computing unit 104 using the response manager unit 220. The safety command "SCL002" may be represented as "VSA-1", depicting an obsolete safety command that is no longer supported. The VSA (Vehicle Stop Action) may refer to a specific safety measure implemented by the vehicle, such as the HMG, which may be conducted independently of the autonomous system. The VSA commands focus primarily on the safety of the vehicle. This action prevents skidding and loss of control during cornering by adjusting engine output and applying brakes to specific wheels.

Referring now to FIG. 12, a table 1200 representing at least one safety command corresponding to an ID of the faulty component, or predefined component ID is illustrated, in accordance with some embodiments of the present disclosure. In an embodiment, table 1200 illustrates fault information, and the safety mechanism corresponding to the faulty component, the HSRs, and the SSRs. Particularly, the table 1200 may include mapping between HSR/SSR IDs, the component IDs, with safety mechanism IDs. The safety mechanism IDs may be represented as SM001, SM002, SM00N, etc. The computing unit 104 using the response manager unit 220, to determine the safety mechanism, may look up the safety mechanism IDs based on the HSR/SSR IDs and the component IDs.

For example, for the component ID "CompID1" mapped with HSR1, that may include the hardware faults information such as "Aurix 1/2 monitors transceiver related faults through $FSP1\_AX1/2\_AX5$, $SS1\_PMICx\_R$ signals". Corresponding to the predefined component ID "CompID1" and HSR1, a safety mechanism ID "SM001, SM003" may be mapped in the table 1200, and determined by the computing unit 104 using the response manager unit 220. The safety mechanism ID SM001 may include "MCU emergency stop in case of severe MCU failure" and the safety mechanism ID SM003 may include "implementation of self-test mechanism for SFFs in functional blocks to detect faults in monitors". Similarly, the predefined component ID CompID5 mapped with the SSR ID SSR5, may include fault information concerning the watchdog timer to ensure software units execute within predefined time limits. Accordingly, the safety mechanism ID SM007 may be mapped with the predefined component ID CompID5 and the SSR ID SSR5. The safety mechanism ID and the safety command ID may be executed by the computing unit 104, to mitigate the faults occurring in the vehicle.

The tables 400, 500, 600, 700, 800, 900, 1000, 1100, and 1200 explained herein may be exemplary, however, similar exhaustive tables may be stored in respective databases during the design stages of the vehicle. The various identifiers illustrated in the tables of FIGS. 4-12 may not be limited as shown, and it would be appreciated to a person skilled in the art that that similar tables with additional identifiers may be created and stored in the respective databases during the design stages of the vehicle. Such tables may encompass almost every aspect of faults that may occur in the vehicle, and hence, a comprehensive diagnosis of all failure modes in the vehicle may be diagnosed and mitigated.

Figure 13:
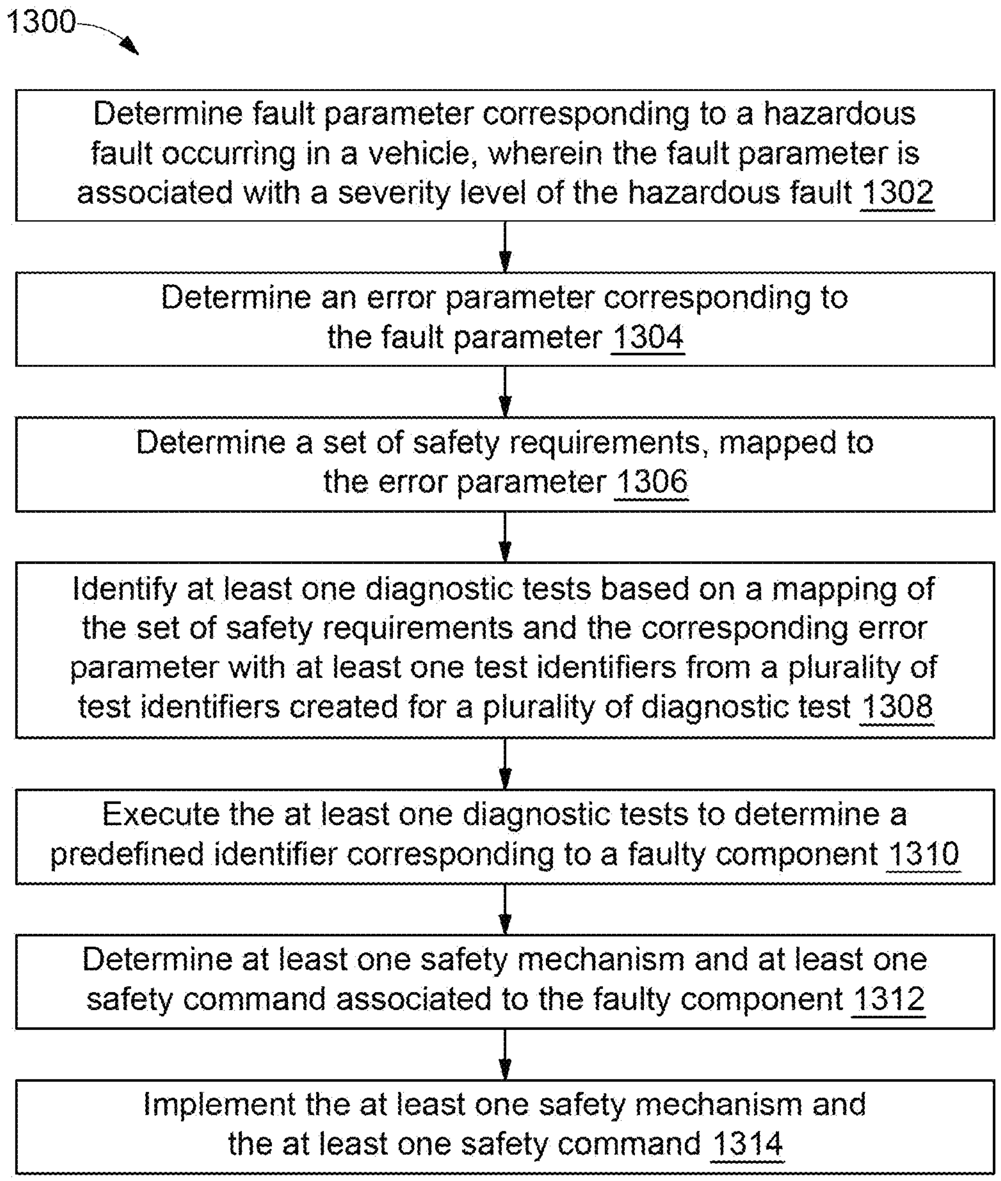
FIG. 13 illustrates a flow diagram of a method of implementing safety mechanism in the vehicle, in accordance with some embodiments of the present disclosure.

Referring now to FIG. 13, a flow diagram 1300 of a method of implementing safety mechanism in the vehicle is illustrated, in accordance with some embodiments of the present disclosure. FIG. 13 is explained in conjunction with FIGS. 1-12. At step 1302, of the flow diagram 1300, the computing unit 104 may determine the fault parameter corresponding to the hazardous fault occurring in the vehicle. Further, the fault parameter may be associated with the severity level of the hazardous fault. At step 1304, of the flow diagram 1300, the computing unit 104 may determine the error parameter corresponding to the fault parameter. At step 1306, the computing unit 104 may determine the set of safety requirements mapped to the error parameter. At step 1308, the computing unit 104 may identify at least one diagnostic test based on the mapping of the set of safety requirements and the corresponding error parameter with at least one test identifier from a plurality of test identifiers created for the plurality of diagnostic tests. Further, at step 1310, the computing unit 104 may execute at least one diagnostic test to determine the predefined component identifier corresponding to the faulty component. At step 1312, the computing unit 104 may determine at least one safety mechanism and at least one safety command associated with the faulty component. At step 1314, the computing unit 104 may implement at least one safety mechanism and the at least one safety command to mitigate the fault associated with the faulty component. As a result, managing the faults and hazardous risks in the faulty components of the vehicle.

As will be also appreciated, the above-described techniques may take the form of computer or controller-implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 14:
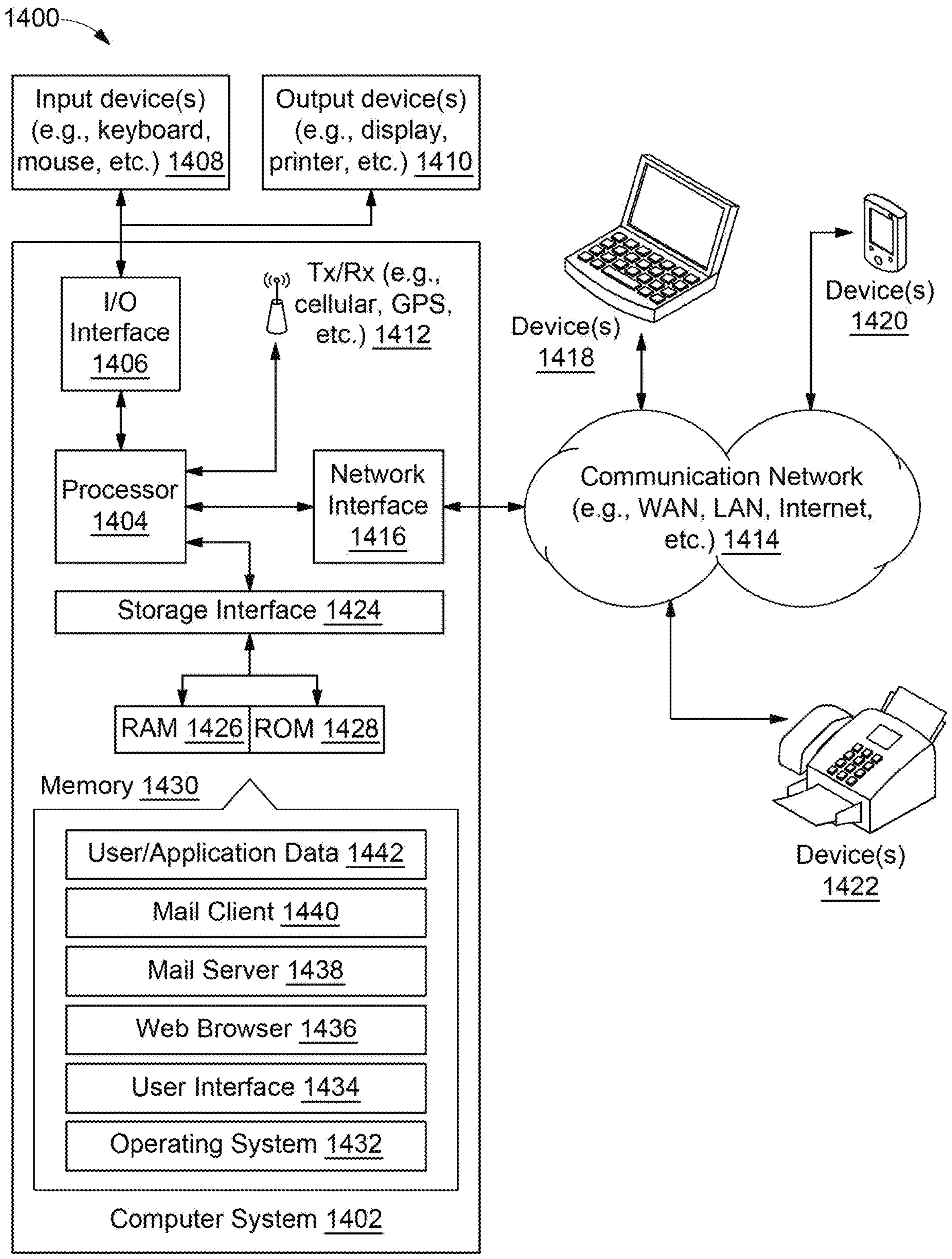
FIG. 14 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 14, a block diagram of an exemplary computer system 1402, similar to the computing unit 104, for implementing safety mechanism in a vehicle is illustrated. The computer system 1402 may include a central processing unit ("CPU" or "processor") 1404. The processor 1404 may include at least one data processor for executing program components for executing user-generated or system-generated requests. A user may include a person, a person using a device such as such as those included in this disclosure, or such a device itself. The processor 1404 may include specialized processing units such as integrated system (bus) controllers, memory management control units, floating point units, graphics processing units, digital signal processing units, etc. The processor 1404 may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 1404 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1404 may be disposed in communication with one or more input/output (I/O) devices via I/O interface 1406. The I/O interface 1406 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 1406, the computer system 1402 may communicate with one or more I/O devices. For example, the input device 1408 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1410 may be a printer, fax machine, video display (e.g., cathode ray tube (CRT), liquid crystal display (LCD), light-emitting diode (LED), plasma, or the like), audio speaker, etc. In some embodiments, a transceiver 1412 may be disposed in connection with the processor 1404. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 1404 may be disposed in communication with a communication network 1416 via a network interface 1414. The network interface 1414 may communicate with the communication network 1416. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1416 may include, without limitation, a direct interconnection, local area network (LAN), wide area network (WAN), wireless network (e.g., using Wireless Application Protocol), the Internet, etc. Using the network interface 1414 and the communication network 1416, the computer system 1402 may communicate with devices 1418, 1420, and 1422. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 1402 may itself embody one or more of these devices.

In some embodiments, the processor 1404 may be disposed in communication with one or more memory devices 1430 (e.g., RAM 1426, ROM 1428, etc.) via a storage interface 1424. The storage interface may connect to memory devices 1430 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 1430 may store a collection of program or database components, including, without limitation, an operating system 1432, user interface application 1434, web browser 1436, mail server 1438, mail client 1440, user/application data 1442 (e.g., any data variables or data records discussed in this disclosure), etc. The operating system 1432 may facilitate resource management and operation of the computer system 1402. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 1434 may facilitate display, execution, interaction, manipulation, or operation of program components through textual or graphical facilities. For example, user interfaces may provide computer interaction interface elements on a display system operatively connected to the computer system 1402, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 1402 may implement a web browser 1436 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 1402 may implement a mail server 1438 stored program component. The mail server may be an Internet mail server such as MICROSOFT® EXCHANGE®, or the like. The mail server may utilize facilities such as ASP, ActiveX, ANSI C++/C#, MICROSOFT.NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 1402 may implement a mail client 1440 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, the memory 1430 may store user/application data 1442, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

For example, the memory 1430 may store process-executable instructions, which when executed by the processor 1404, may cause the processor 1404 to implement safety mechanism in the vehicle. The memory 1430 may include various units. In an embodiment, the memory 1430 may include a reader unit 208 and a collector unit 210. In such an embodiment, the processor 1404 may be configured to a fault parameter corresponding to a hazardous fault occurring in a vehicle. The fault parameter is associated with the severity level of the hazardous fault. In an embodiment, the memory 1430 may include a diagnostic monitoring unit 212. In an embodiment, the processor 1404 may be configured to the set of safety requirements, mapped to the error parameter. Further, the processor 1404 may be configured to the error parameter corresponding to the fault parameter. The memory 1430 may include a fault classifier unit 214 and a fault detector unit 216. The processor 1404 may be configured to determine at least one diagnostic tests based on a mapping of the set of safety requirements and the corresponding error parameter with at least one test identifiers from a plurality of test identifiers created for a plurality of diagnostic tests. The memory 1430 may include an effect identifier unit 218 and a response manager unit 220. In such an embodiment, the processor 1404 may be configured to determine the at least one diagnostic tests to determine a predefined identifier corresponding to a faulty component. Further, the processor 1404 may be configured to implement the at least one safety mechanism and the at least one safety command.

Various embodiments provide for method and system for implementing safety mechanism in the vehicle. The disclosed method and system have various advantages, some of which are enlisted below.

The method and system provide classification of faults in hazardous and non-hazardous parameters in order to ensure the hazardous faults may be determined in timely manner, and further the non-hazardous faults may be prevented from being converted to the hazardous faults.

The method and system provide enhanced accessibility. The method and system provide different safety criteria for the hardware failure in the vehicle and the software failure in the vehicle. Additionally, the software safety requirements encompass functions related to time-critical operations, timing constraints, and an operating mode of the vehicle. This is particularly beneficial in catering to the various requirements of the hardware and software components of the vehicle.

The method and system may provide protection to a plurality of components of the vehicle by incessantly determining health status and based on that, the diagnosis are performed. The system may prevent the diagnosis of the component in the initial stage, thus preventing any sudden failure, and enhance the life cycle of the component.

The method and system may provide reliability in fault management, thus ensuring consistent monitoring and effective communication to prevent any error in determination of the fault parameter. Thereby, the system ensures that the faulty component may be identified within a predefined time period.

The method and the system may provide safety of passengers, other road users, and the vehicle itself in case of system failure or emergency within the predefined time period. As the status of the fault parameter is update periodically and the fault parameter may be capable of determining the error parameter. The error parameter leads to data corruption that occurs due to improper memory management or driver bugs, are managed by implementing data integrity checks, redundancy management for CAN interfaces, and encryption for sensitive data. Therefore, the system may ensure that data integrity is maintained, and communication network remains secure.

Similarly, the processor diagnostic failures, which may be caused by factors such as overheating, voltage irregularities, or firmware corruption, are addressed through the software safety requirements such as a plurality of thermal sensors with automatic shutdown features, stable power supplies, and support for automatic updates. Thus, the system provides measures to protect the processor from physical damage and ensure continuous, stable operation.

The method and system may correlate between the error parameter and the corresponding hardware and software safety requirements that may be essential for ensuring robust system performance and reliability. Each error parameter may identify specific issues that may arise within the vehicle, such as hardware malfunctions, software errors, or environmental interferences. By linking these error parameters to targeted hardware and software safety requirements, the system can be designed to pre-emptively address and mitigate issues, thereby enhancing vehicle resilience.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for implementing safety mechanism in the vehicle. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term “memory” should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for implementing safety mechanism in vehicles, the method comprising:

determining, by a computing unit, a fault parameter corresponding to a hazardous fault occurring in a vehicle, wherein the fault parameter is associated with a severity level of the hazardous fault;

determining, by the computing unit, an error parameter corresponding to the fault parameter;

determining, by the computing unit, a set of safety requirements mapped to the error parameter, wherein the set of safety requirements comprises:

a hardware safety requirement; and a software safety requirement;

identifying, by the computing unit, at least one diagnostic tests based on a mapping of the set of safety requirements and the corresponding error parameter with at least one test identifiers from a plurality of test identifiers created for a plurality of diagnostic tests;

executing, by the computing unit, the at least one diagnostic tests to determine a predefined component identifier corresponding to a faulty component;

determining, by the computing unit, at least one safety mechanism and at least one safety command associated to the faulty component; and implementing, by the computing unit, the at least one safety mechanism and the at least one safety command for mitigating one or more faults associated with the faulty component.

2. The method of claim 1, wherein determining the fault parameter corresponding to the hazardous fault further comprises:

determining, by the computing unit, the hazardous fault further comprising:

pre-processing, by the computing unit, sensor data acquired from a sensor unit of the vehicle for generating a sensor transformed data; and detecting, by the computing unit, the hazardous fault in the vehicle by implementing a plurality of predefined assessments on the sensor transformed data.

3. The method of claim 1, further comprising:

identifying, by the computing unit, a predefined safety criteria corresponding to the fault parameter;

determining, by the computing unit, a degree of impact based on the fault parameter, the predefined safety criteria and the set of safety requirements, and determining, by the computing unit, at least one safety mechanism based on the degree of impact, the predefined safety criteria and the set of safety requirements.

4. The method of claim 3, wherein determining the at least one safety mechanism and the at least one safety command further comprises:

determining, the at least one safety command further comprising:

determining, by the computing unit, a health status of a Vehicle Interface Controlling (VIC) unit based on a vehicle information data received therefrom; and determining, by the computing unit, the at least one safety command with the vehicle information data, the degree of impact, and the predefined safety criteria.

5. The method of claim 1, wherein implementing the at least one safety mechanism and the at least one safety command further comprises:

initiating, by the computing unit, a timer for a predefined time period upon determining the hazardous fault; and implementing, by the computing unit, the at least one safety mechanism and the at least one safety command within the predefined time period.

6. A system for implementing safety mechanism in vehicles, the system comprising:

a computing unit, comprising:

a processor; and a memory communicatively coupled to the processor, wherein the memory stores processor-executable instructions, which when executed by the processor, cause the processor to:

determine a fault parameter corresponding to a hazardous fault occurring in a vehicle, wherein the fault parameter is associated with a severity level of the hazardous fault;

determine an error parameter corresponding to the fault parameter;

determine a set of safety requirements mapped to the error parameter, wherein the set of safety requirements comprises:

a hardware safety requirement; and a software safety requirement;

identify at least one diagnostic tests based on a mapping of the set of safety requirements and the corresponding error parameter with at least one test identifiers from a plurality of test identifiers created for a plurality of diagnostic tests;

execute the at least one diagnostic tests to determine a predefined component identifier corresponding to a faulty component;

determine at least one safety mechanism and at least one safety command associated to the faulty component; and implement the at least one safety mechanism and the at least one safety command to mitigate one or more faults associated with the faulty component.

7. The system of claim 6, wherein to determine the hazardous fault, the processor-executable instructions, on execution, further cause the processor to:

pre-process sensor data acquired from a sensor unit of the vehicle for generating a sensor transformed data; and detect the hazardous fault in the vehicle by implementing the plurality of predefined assessments on the sensor transformed data.

8. The system of claim 6, wherein for the fault parameter determined, the processor-executable instructions, on execution, further cause the processor to:

identify a predefined safety criteria corresponding to the fault parameter;

determine a degree of impact based on the fault parameter, the predefined safety criteria and the set of safety requirements, and determine the at least one safety mechanism corresponding based on the degree of impact, the predefined safety criteria and the set of safety requirements.

9. The system of claim 8, wherein to determine the at least one safety command, the processor-executable instructions, on execution, further cause the processor to:

determine a health status of a Vehicle Interface Controlling (VIC) unit based on a vehicle information data received therefrom; and determine the at least one safety command with the vehicle information data, the degree of effect, and the predefined safety criteria.

10. The system of claim 6, wherein to implement the at least one safety mechanism and the at least one safety command, the processor-executable instructions, on execution, further cause the processor to:

initiate a timer for a predefined time period upon determining the hazardous fault; and implement the at least one safety mechanism and the at least one safety command within the predefined time period.

11. A non-transitory computer-readable medium storing computer-executable instructions for implementing safety mechanism in vehicles, the computer-executable instructions configured for:

determining a fault parameter corresponding to a hazardous fault occurring in a vehicle, wherein the fault parameter is associated with a severity level of the hazardous fault;

determining an error parameter corresponding to the fault parameter;

determining a set of safety requirements, mapped to the error parameter, wherein the set of safety requirements comprises:

a hardware safety requirement; and a software safety requirement;

identifying at least one diagnostic tests based on a mapping of the set of safety requirements and the corresponding error parameter with at least one test identifiers from a plurality of test identifiers created for a plurality of diagnostic tests;

executing the at least one diagnostic tests to determine a predefined component identifier corresponding to a faulty component;

determining at least one safety mechanism and at least one safety command associated to the faulty component; and implementing the at least one safety mechanism and the at least one safety command for mitigating one or more faults associated with the faulty component.

12. The non-transitory computer-readable medium of claim 11, wherein the computer-executable instructions are further configured for determining the hazardous fault, wherein determining the hazardous fault further comprises:

pre-processing sensor data acquired from a sensor unit of the vehicle for generating a sensor transformed data; and detecting the hazardous fault in the vehicle by implementing a plurality of predefined assessments on the sensor transformed data.

13. The non-transitory computer-readable medium of claim 11, wherein the computer-executable instructions are further configured for:

identifying a predefined safety criteria corresponding to the fault parameter;

determining a degree of impact based on the fault parameter, the predefined safety criteria and the set of safety requirements, and determining at least one safety mechanism based on the degree of impact, the predefined safety criteria and the set of safety requirements.

14. The non-transitory computer-readable medium of claim 11, wherein to determine the at least one safety command, the computer-executable instructions are further configured for:

determining a health status of a Vehicle Interface Controlling (VIC) unit based on a vehicle information data received therefrom; and determining the at least one safety command with the vehicle information data, the degree of impact, and the predefined safety criteria.

15. The non-transitory computer-readable medium of claim 11, wherein to implement the at least one safety mechanism and the at least one safety command, the computer-executable instructions are further configured for:

initiating a timer for a predefined time period upon determining the hazardous fault; and implementing the at least one safety mechanism and the at least one safety command within the predefined time period.

* * * * *